(12) United States Patent
Born et al.

(10) Patent No.: US 10,667,547 B2
(45) Date of Patent: Jun. 2, 2020

(54) CONTINUOUS DRUM DRYER AND METHODS OF USE THEREOF

(71) Applicant: Continuus Pharmaceuticals, Inc., Woburn, MA (US)

(72) Inventors: Stephen C. Born, Belmont, MA (US); Joshua Dittrich, Brookline, MA (US); Bayan T. Takizawa, Sudbury, MA (US); Salvatore Mascia, Boston, MA (US)

(73) Assignee: Continuus Pharmeceuticals, Inc., Woburn, MA (US)

( * ) Notice: Subject to any disclaimer, the term of this patent is extended or adjusted under 35 U.S.C. 154(b) by 22 days.

(21) Appl. No.: 16/075,012

(22) PCT Filed: Feb. 3, 2017

(86) PCT No.: PCT/US2017/016568
§ 371 (c)(1),
(2) Date: Aug. 2, 2018

(87) PCT Pub. No.: WO2017/136765
PCT Pub. Date: Aug. 10, 2017

(65) Prior Publication Data
US 2019/0045818 A1    Feb. 14, 2019

Related U.S. Application Data

(60) Provisional application No. 62/291,220, filed on Feb. 4, 2016.

(51) Int. Cl.
*A23L 3/48*    (2006.01)
*B01D 1/24*    (2006.01)
(Continued)

(52) U.S. Cl.
CPC .............. *A23L 3/48* (2013.01); *B01D 1/225* (2013.01); *B01D 1/24* (2013.01); *F26B 5/041* (2013.01); *F26B 17/284* (2013.01)

(58) Field of Classification Search
CPC .......... F26B 5/06; F26B 5/041; F26B 17/284; A23L 3/48; B01D 1/24; B01D 1/225
(Continued)

(56) References Cited

U.S. PATENT DOCUMENTS 1,530,439 A    3/1925 Testrup et al.
2,087,788 A  *  7/1937 Thal ...................... C11D 13/26
                                                    159/49
(Continued)

FOREIGN PATENT DOCUMENTS

EP    0 170 235         2/1986
GB       834765 A  *   5/1960  ............... C01C 3/10
(Continued)

OTHER PUBLICATIONS

Supplemental European Search Report dated Jun. 18, 2019 issued in EP Application No. 17748299.9.
(Continued)

*Primary Examiner* — Stephen M Gravini
(74) *Attorney, Agent, or Firm* — Arnonld & Porter Kaye Scholer

(57) ABSTRACT

The present disclosure provides for a continuous drying apparatus and a method of using the apparatus in the preparation of dried solids from slurries. The methods and apparatus are useful for the production of fine chemicals and pharmaceuticals, particularly using Integrated Continuous Manufacturing (ICM), but can also be integrated with other manufacturing processes, such as batch and semi-continuous processes.

21 Claims, 16 Drawing Sheets

(51) Int. Cl.
*B01D 1/22* (2006.01)
*F26B 5/04* (2006.01)
*F26B 17/28* (2006.01)

(58) Field of Classification Search
USPC .......................................................... 34/384
See application file for complete search history.

(56) References Cited

U.S. PATENT DOCUMENTS

| | | | |
|---|---|---|---|
| 2,434,966 A | 1/1948 | Sherman | |
| 2,903,054 A | 9/1959 | Fischer | |
| 3,203,109 A * | 8/1965 | Moore | A23B 7/028 |
| | | | 34/62 |
| 3,208,506 A | 9/1965 | Angstadt et al. | |
| 3,299,527 A | 1/1967 | Doukas | |
| 3,363,665 A | 1/1968 | Daane et al. | |
| 3,395,746 A | 8/1968 | Szabo et al. | |
| 3,414,982 A | 12/1968 | Oas | |
| 3,442,026 A | 5/1969 | Bernard | |
| 3,478,439 A | 11/1969 | Hyldon | |
| 3,804,145 A | 4/1974 | Arnold et al. | |
| 3,384,440 A | 9/1974 | McCracken | |
| 3,913,346 A * | 10/1975 | Moody, Jr. | F04O 29/042 |
| | | | 62/197 |
| 4,115,529 A * | 9/1978 | Behling | C01B 7/015 |
| | | | 423/462 |
| 4,127,944 A | 12/1978 | Giacobello | |
| 4,515,540 A * | 5/1985 | Pillis | F04O 29/042 |
| | | | 417/310 |
| 6,314,659 B1 * | 11/2001 | Parker | D21F 1/30 |
| | | | 34/114 |
| 7,272,894 B2 | 9/2007 | Harada et al. | |
| 2001/0008049 A1 | 7/2001 | Noro et al. | |
| 2002/0002208 A1 | 1/2002 | Martel et al. | |
| 2003/0062431 A1 | 4/2003 | Sonehara et al. | |
| 2013/0047457 A1 | 2/2013 | Buter et al. | |
| 2019/0045818 A1 * | 2/2019 | Born | A23L 3/48 |

FOREIGN PATENT DOCUMENTS

| | | | | |
|---|---|---|---|---|
| JP | | 10225380 A * | 8/1998 | |
| WO | WO-2017136765 A1 * | | 8/2017 | A63L 3/48 |

OTHER PUBLICATIONS

International Search Report issued in International Application No. PCT/US2017/016568 on Apr. 25, 2017.

* cited by examiner

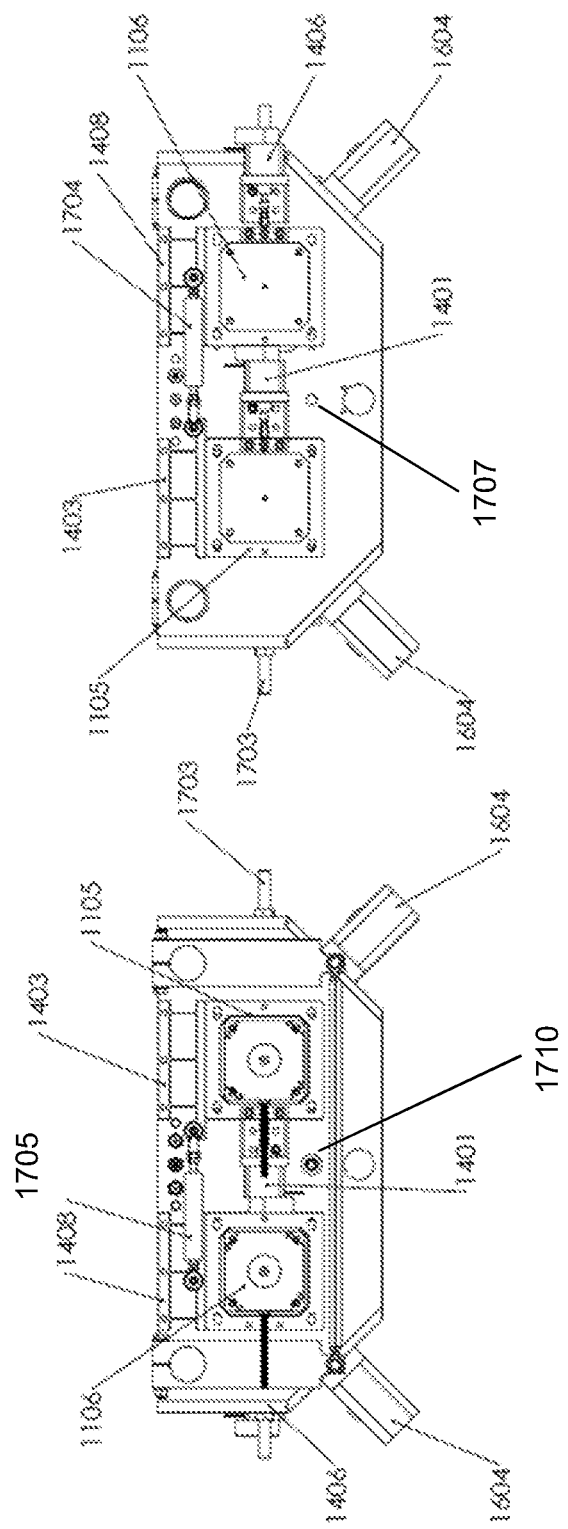

CONTINUOUS DRUM DRYER AND METHODS OF USE THEREOF

REFERENCE TO RELATED APPLICATION

This application is a national stage application under 35 U.S.C. § 371 of International Application No. PCT/US2017/016568, wherein International Application No. PCT/US2017/016568 claims the benefit of U.S. Provisional Application No. 62/291,220, filed Feb. 4, 2016, the contents of each of which are herein incorporated by reference in their entireties.

FIELD OF THE INVENTION

The present disclosure relates to methods and devices for the continuous drying of slurries during continuous manufacturing processes, as well semi-continuous and batch manufacturing processes.

BACKGROUND OF THE INVENTION

Integrated Continuous Manufacturing (ICM), consists of a series of unit operations that operate in flow and are integrated into a seamless end-to-end (from synthesis to final product) manufacturing process. ICM represents a shift from the batch manufacturing processes used in the pharmaceutical industry. In contrast to batch manufacturing, ICM's unit operation integration process results in significant operational advantages. ICM significantly reduces manufacturing costs (>50% reduction) and lead times (>90% reduction), has a smaller footprint (~90% reduction), and provides higher quality drugs. These advantages were demonstrated in the first-of-its kind ICM pilot plant (capacity of 1.5 tons of Active Pharmaceutical Ingredient (API)/year) at MIT, which was able to produce finished coated tablets from raw ingredients through a single, seamless end-to-end process. See Mascia, et al., "End-to-end continuous manufacturing of pharmaceuticals: integrated synthesis, purification, and final dosage formation," *Angewandte Chemie International Edition*, 52(47):12,359-12,363 (2013).

Current pharmaceutical manufacturing consists of unconnected individual steps in large batch units including chemical reactions, filtering, precipitating, drying, milling, and tableting. Quality is evaluated by testing at each step (e.g., quality by testing, QbT). This batch process is plagued by long lead times, geographical dispersion of unit operations, and large manufacturing footprints. It is estimated that more than $50 billion a year is wasted due to inefficient manufacturing. Meanwhile, attempts to improve quality have resulted in increasing numbers of product recalls.

In contrast to the quality by testing approach of the batch manufacturing process, for ICM processes, quality is designed into the system (Quality by Design, QbD). In QbD processes, controllers maintain quality thresholds throughout the production cycle, ensuring that the end product of the entire process meets its quality specification. To create ICM systems, devices and methods for each of the various unit operations need to be developed that can process streams of materials. Further, the unit devices require the ability to adjust to variations in the process stream and to provide feedback to the ICM process controller. The unit devices may include a variety of real-time sensors and Process Analytical Technologies (PATs) to detect changes in process parameters. The ICM process controller integrates the signals across the unit operations and adjusts the parameters to limit the variation within the product stream. Current unit devices, designed to be used in batch mode are generally incompatible with ICM processes, operate at inappropriate scales, do not provide for real time control.

There is a need for the development of unit operation processes and devices that can be incorporated into ICM methods. The present disclosure relates and is directed to methods and devices for the preparation of dried solids from slurries. The solids can be intermediate products or a final active pharmaceutical ingredient (API). The continuous drying apparatuses of the present disclosure are designed to accept a continuous stream of input slurry and output a continuous stream of dried solid with a defined residual moisture content.

There exists a number of patents directed to drum dryers including U.S. Pat. No. 7,272,894 issued to Ajinomoto Co., Inc. on Sep. 25, 2007, European Patent Publication No. EP0170235 to Henkel Corporation dated Feb. 5, 1986, U.S. Pat. No. 3,478,439 issued to Quaker Oats Co. on Nov. 18, 1969, U.S. Pat. No. 3,363,665 to Beloit Corp. on Jan. 16, 1968, U.S. Pat. No. 3,299,527 to Du Pont on Jan. 24, 1967, and U.S. Pat. No. 2,903,054 to Davenport Machine and Foundry on Sep. 8, 1959, each or which are hereby incorporated by reference in their entireties.

During the development and manufacture of pharmaceuticals, the need to prepare dried solids from slurries and solutions containing an intermediate product or active pharmaceutical ingredient (API) occurs regularly. A variety of approaches have been developed including spray dryers, freeze driers, filtration dryers, single drum dryers, agitated paddle dryers, fluidized bed dryers, and spin flash dryers. Conventional oven dryers often used for drying a slurry suffer from a number of deficiencies that make them unsuitable for use in continuous production methods. First, most conventional oven dryers are significantly larger than the continuous drying apparatus as provided in the present specification. The large footprints typical of conventional dryers largely preclude their use in compact continuous production systems. While some conventional dryers can be operated under a vacuum, including a vacuum in the process generally limits the drying process to a batch mode. Accordingly, conventional drying systems are generally designed to be operated in batch mode (like the production of pharmaceuticals themselves) and they cannot be readily integrated into continuous systems. Existing systems, designed for batch-wise use also do not incorporate features that provide for the flexible control and adjustment of the drying rate, the slurry input rates, removal of dried materials, and the recovery of liquids that are essential to a complete continuous production system. In addition, conventional oven dryers, and other approaches, also require personnel to load and unload the material in the dryer resulting in potential exposure of the personnel to hazardous substances and also increasing the risk of contamination (and loss) of the pharmaceutical product. Finally, in addition to batch processing, conventional systems often require extended residence times (e.g., >12 hours) that can result in product degradation and agglomeration.

Fluidized bed dryers, which can be run continuously or in batch, have also been used but suffer from the disadvantage of operating under positive pressure, and cannot operate in a vacuum. This approach also suffers from several other limitations. First, fluidized bed dryers are generally much larger than the devices described in the present specification and are therefore difficult to integrate into a continuous process system for the production of a pharmaceutical. Similarly, fluidized bed dryers require large throughput to be effective; they are not flexible to process smaller volumes nor can they readily accommodate changes in flow and slurry characteristics. Simply shrinking the size of a fluidized bed dryer results in unacceptable inefficiencies. Another disadvantage of fluidized bed dryers is that they operate at high temperature and present unacceptable risks of thermal degradation to the intermediate, API, or drug product. Finally, like the conventional dryer, fluidized bed dryers can have long residence times (e.g. >4 hours), which can result in product degradation and agglomeration.

There are continuous dryers that are currently used in industry. For example, Artisan Industries has developed a thin/wiped-film evaporator (Protherm® 50); however, there are several limitations. First the system is designed for solvent recovery or producing a liquid product or wet powder, not specifically to dry a solution to obtain a dry powder product. Because the Artisan system uses horizontal, agitated vacuum evaporation, it is limited to 10-25 L/hr, with a limited 0.5 ft$^2$ evaporative surface. Second, the system cannot dry slurries containing entrained solvent. Third the Artisan system is large, cart-mounted, and cannot fit into a fume hood, thereby reducing flexibility in drug development using continuous production methods.

Artisan Industries also produces an agitated dryer (Rototherm® D); however, this technology also has several limitations. First, the system is designed to remove moisture or solvent from powders and slurries, especially for applications requiring long residence times (20 minutes to several hours). Second, the system uses a horizontal, agitated vacuum drying system that has only a 2 ft$^2$ evaporative surface. Finally, the system is skid-mounted, and cannot fit into a fume hood (reduced flexibility in drug development).

A continuous drum dryer was developed at the Novartis-MIT Center for Continuous Manufacturing. This unit operation was very effective, and was able to dry a slurry of approximately 5-15 wt %. solid, though not below 1 wt %. There are significant advantages over current dryers, including reduced residence time of the drum dryer (approximately 1 minute), which is much shorter than conventional dryers (residence times often >12 hours). Reduced residence time also reduces the probability of agglomeration and degradation. The unit operation was automated and did not require intensive labor to operate it. Finally, the unit operation had a significantly smaller footprint than corresponding batch ovens.

However, there were also several limitations to the Novartis-MIT technology. First, the unit used convective drying, which places the system under positive pressure, making collection of the dried powder difficult (the dried powder was dispersed by the positive pressure). A convective drying approach precludes the incorporation of a vacuum system to the drying process. The Novartis-MIT continuous dryer system prevented the use of very low temperatures and short residence times and decreased the overall drug purity levels (possibly due to thermal degradation). Using the Novartis-MIT continuous dryer system, dilute pharmaceutical suspensions (for example API solid wt % 5-15%) could not be easily handled. For example, the Novartis-MIT continuous dryer system included a fixed drum gap so that the changing flow rate, changing slurry viscosity, and other variations in the continuous process were not able to be accommodated in real time through automated control. The inability of the previous continuous dryer system to respond real-time to changing material viscosities (for example, due to step-changes in initial API concentration) is a significant disadvantage and hinders the development of fully automated systems, with control parameters adjustable through appropriate code manipulation. The Novartis-MIT continuous drum dryer systems required significant intervention to maintain a continuous steady-state operation.

Accordingly there existed a need to provide a continuous drum dryer system for incorporation into ICM processes that could be adjusted to accommodate changes in slurry input, changes in concentrations, and other variations inherent in a continuous process. The system further needed to be capable of providing for a vacuum to allow for lower temperature drying and reduced residence times. It was also desirable to develop a continuous dryer having a small footprint so that it could be moved and adapted to different continuous production processes and could be isolated within an appropriate containment system, such as a fume hood. The present disclosure further provides for real time monitoring of process parameters including drying temperature, residual moisture content, vacuum pressure, and video monitoring. Finally, the apparatus of the present disclosure provides for the recovery of the liquid from the slurry, improving safety and environmental sustainability.

SUMMARY OF THE INVENTION

The present disclosure provides for, and includes a continuous drying apparatus, comprising a pair of rotatable drums 1101 arranged in parallel to the axes of rotation, separated by a gap 1410, and having drum roller drive assembly 1200, said pair of rotatable drums 1101 comprising an evaporative surface 1110 for receiving a slurry, the apparatus including at least one heating element 1102, a pair of scrapers 1301 for removing a dried solid from said evaporative surface 1110 of said rotatable drums 1101, and a housing 1600 capable of operation at a reduced pressure, the apparatus including an outlet 1610 and a slurry inlet 1607.

A method of continuously drying a slurry using a continuous drying apparatus comprising providing a slurry to a slurry inlet 1607 of a continuous drying apparatus comprising a pair of rotatable drums 1101 arranged in parallel to the axes of rotation, separated by a gap 1410, and having drum roller drive assembly 1200, said pair of rotatable drums 1101 comprising an evaporative surface 1110 for receiving a slurry and at least one heating element 1102, the apparatus includes a pair of scrapers 1301 for removing a dried solid from said evaporative surface 1110 of said rotatable drums 1101, a housing 1600 capable of operation at a reduced pressure, an outlet 1610; and a slurry inlet 1607, the method includes heating the pair of rotatable drums 1101 to a first temperature, rotating the pair of rotatable drums 1101 at a rotation rate, drying the slurry to produce a cake and an evaporate, scraping the cake from the pair of rotatable drums 1101, collecting the cake as a dried solid, and passing the dried solid through the outlet 1610.

BRIEF DESCRIPTION OF THE DRAWINGS

The present disclosure is disclosed with reference to the accompanying drawings, wherein:

FIG. 12A-B are technical drawings illustrating a drum gap actuator system according to an aspect of the present disclosure. FIGS. 12A and 12B are front and rear views of a drum dryer respectively, indicating the location of sensors according to an aspect of the present disclosure. This aspect depicts a drum gap adjustment sub-assembly, which is comprised of a front actuator 1401 which pushes against a bearing block 1105. This repositioning is mediated by a flexure 1403 and monitored by a linear position sensor 1704;

Corresponding reference characters indicate corresponding parts throughout the several views. The examples set out herein illustrates an aspect of the present disclosure but should not be construed as limiting the scope of the present disclosure in any manner.

DETAILED DESCRIPTION

Figure 1:
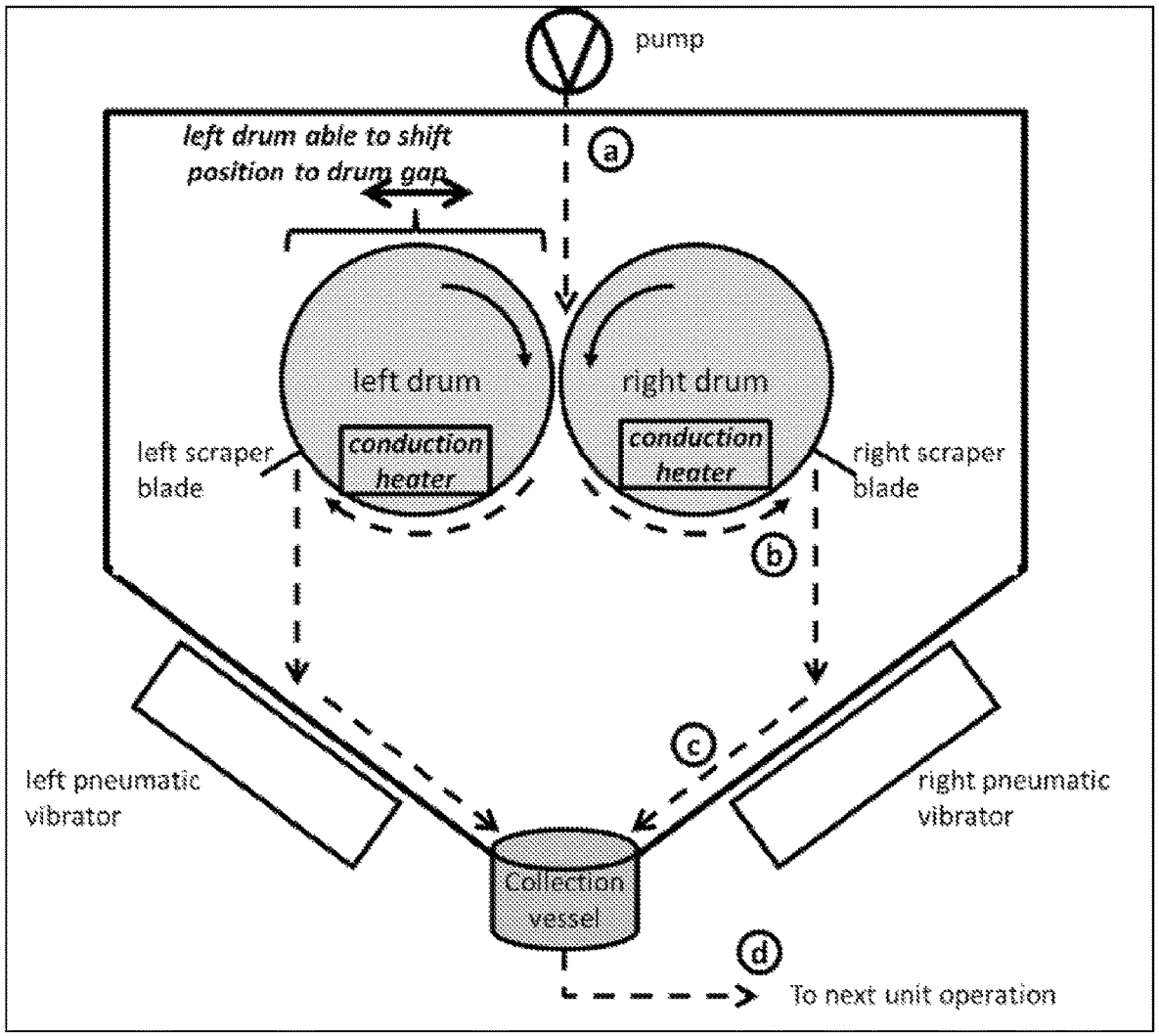
FIG. 1 is a schematic of a drum dryer and process according to the present disclosure.

The present disclosure provides for, and includes a continuous drying apparatus capable of continuously drying a stream of intermediate product, final product, as well as an Active Pharmaceutical Ingredient (API). In certain aspects, a continuous process is necessary because reactions and other processes often occur in the liquid phase and the API or intermediate product must be prepared for subsequent processing steps. In other aspects, a continuous drying apparatus according to the present disclosure provides for real-time control of a drying process and can improve the efficiency of product development. Generally, before certain steps can occur, such as drug formulation, the solution must be dried to a powder, with minimal liquid content. This is a very common function in the drug production cycle.

The continuous drying apparatus of the present disclosure offers significant advantages over previous drying unit operations. First, the present apparatus has a significantly smaller footprint (less than 10,000 centimeters' ($cm^2$) making it suitable for placing in a fume hood or other safety containment structures; though this can be scaled up to meet higher throughput requirements. In aspects according to the present disclosure, the size of the drying apparatus can be up to 325,091 $cm^2$. It also provides for a mobile and configurable drying system that can be readily incorporated into a continuous process, or other manufacturing process (e.g. semi-continuous or batch). Second, the apparatus is capable of continuous operation, incorporating a number of sensors and an ability to adjust parameters such as drying temperature, pressure, and flow rate in real time. The apparatus is further capable of accommodating low (and variable) throughputs; the range of throughputs is approximately 1 wt % solid to 80 wt % solid and is therefore easily integrated with other continuous unit operations (or others, such as semi-continuous or batch unit operations) without significant modification. Third, the operation requires a much shorter residence time (~1 minute), which decreases breakdown and agglomeration of the product. Fourth the mechanical action of the drums more efficiently displaces the solvent from the API to produce a thin film. Fifth, a thin film allows for much more efficient heat transfer. Moreover, the thickness of the film can be continuously varied during the operation to accommodate variations in input flows.

The continuous drying apparatus of the present disclosure incorporates one or more of a number of features. In an aspect the apparatus includes two rotatable drums 1101 that incorporate a conductive heating system through resistive heaters inside the drums. This allows the temperature of the drums to be carefully controlled through a control system. The rotatable drums 1101 provide for an evaporative surface of up to 1,296 cm$^2$ in a compact footprint, though the apparatus can be scaled up as appropriate to up to 3.9×10$^6$ cm$^2$. In an aspect, the evaporative surface is less than 2000 cm$^2$. In another aspect, the evaporative surface is less than 5000 cm$^2$. In another aspect, the evaporative surface is less than 10,000 cm$^2$. In other aspects, the apparatus can be scaled up to provide an evaporative surface of up to 50,000. In more aspects, the evaporative surface is up to 100,000 cm$^2$. In further aspect, the evaporative surface is up to 1×10$^6$ cm$^2$. In yet a further aspect, the evaporative surface is up to 2×10$^6$ cm$^2$. As provided herein, the evaporative surface can be between 1000 cm$^2$ to 10,000 cm$^2$. In other aspects, the evaporative surface is between 1000 cm$^2$ and 50,000 cm$^2$.

In aspects according to the present disclosure, the system can be operated under vacuum which reduces the boiling point of solvent and enables quicker drying of heat-sensitive APIs, intermediates, and drug products. In aspects according to the present disclosure, the continuous drying apparatus utilizes an adjustable drum gap to accommodate for changes in throughput and slurry characteristics (e.g. granularity, viscosity, composition). The continuous drying apparatus can further include rotatable drums 1101 that are manufactured from lighter drum materials (for example, hard anodized aluminum and metal alloys), making it easier to manipulate and transport. Finally, the compact size and small footprint (typically less than 10,000 cm$^2$, though the apparatus can be scaled up) make the apparatus easy incorporate into a continuous process (or others, such as semi-continuous or batch unit operations) and to isolate, for example for safety and containment. In an aspect, the apparatus can be scaled up to have a footprint of 100,000 cm$^2$. In another aspect, the apparatus can be scaled up to have a footprint of 1×10$^6$ cm$^2$. In yet another aspect, the apparatus can be scaled up to have a footprint of 3.325×10$^6$ cm$^2$. In another aspect, the apparatus can be scaled up to have a footprint of 3,325,091 cm$^2$. The present disclosure provides for and include apparatus having a footprint of between 2000 cm$^2$ to 1×10$^6$ cm$^2$. In another aspect, the apparatus has a footprint of between 2000 cm$^2$ to 10,000 cm$^2$. In other aspects, the apparatus has a footprint of between 10,000 cm$^2$ to 50,000 cm$^2$.

Referring to FIG. 1, there is shown a generalized schematic of a continuous drum dryer according to aspects of the present disclosure. A continuous drum drying apparatus is an apparatus that can accommodate a continuous flow of a slurry (or a corresponding semi-continuous or batch process), provide for drying to a desired level of residual moisture, and provides for the removal of the dried material. As used herein, a continuous drum drying apparatus can run continuously for a day, a week, or months. In an aspect, the continuous drum drying apparatus is capable of being run continuously for 30 min to 1 hour to 1 year or more without requiring a shut down and removal of the dried material.

The present disclosure provides for, and includes, a drum dryer including one or more of the following features: conduction heating of the drums, a reduced pressure system, and a mechanism for varying the gap between the drums. The continuous drum drying apparatus further provides for a collection vessel to collect the dried solid from the apparatus and provide for the transfer of the dried material to a downstream unit operation in a continuous production process (or a corresponding semi-continuous or batch process). The present disclosure provides for and includes for a continuous drying apparatus comprising two drums, rotatable along their longitudinal axes and arranged in parallel to their longitudinal axes. The two drums may further comprise a heater to heat the evaporative surface.

As shown in the schematic in FIG. 1, the drum dryer is a self-contained unit operation that is able to dry a wet slurry to dry powder with minimal moisture content. Starting at the top of the figure, a slurry (a) is continuously pumped onto the rotating drums, where it is spread across the length of the drums. As shown, the drum gap is adjustable so that the thickness of the slurry can be controlled depending on the physical characteristics (e.g. viscosity, solvent, solute) of the input stream, or slurry. The slurry dries through the combined action of conduction heaters (located within the drums) and optionally a reduced pressure/vacuum. In certain aspects, inclusion of mechanisms to provide a reduced pressure/vacuum is especially beneficial because it provides for solvent vaporization at lower temperatures. In certain aspects, degradation of the final product may be prevented by the incorporation of lower temperature drying methods. As the slurry (a) is applied to the drums, the slurry is spread and forms a layer that sticks to the heated drum.

As the heated layer of slurry, now a cake (b), dries on the surface of the two rotating drums, it is transported to more lateral positions, where scraper blades scrape them off of the drum surface. The dried cake is now broken into powder and larger pieces that then fall to the sides of the drum dryer, which are angled to promote gravity-based downward flow. Two vibrators, one on each side, vibrate the sides of the drum dryer, causing the dried/drying powder (c) to fall downward and into the collection vessel. The material (d) is now dried to an anticipated wt % (based on the following parameters: vacuum, temperature, residence time/rotational speed, mass flow rate, cake thickness), and can proceed to the next unit operation.

In aspects according to the present disclosure, the drum dryer unit operation is automated and the dryer unit includes integrated sensor systems. The operation of the dryer unit is run through appropriate software and a control system that is integrated with the other unit operations. In an aspect, a drum dryer unit has a small footprint (2'×2'), and can easily fit in a research laboratory fume hood.

The continuous drum dryer includes two rotating drums that can be configured to provide for an adjustable gap, a pair of scraper blades, and collection vessel and vibrators to aid in the flow of the dried material towards the collection vessel. As provided herein, the dryer drums may be provided with a heating system, shown as a pair of conduction heaters. In use, a flow of material (a) is applied to the paired drums and dried. The dried material (b) is removed from the drums by a pair of scraper blades and the released dried material (c) is collected under gravity and mechanical assistance to a collection vessel and the dried material (d) provided to the next unit operation of a continuous production process, or a semi-continuous or batch process.

Figure 2:
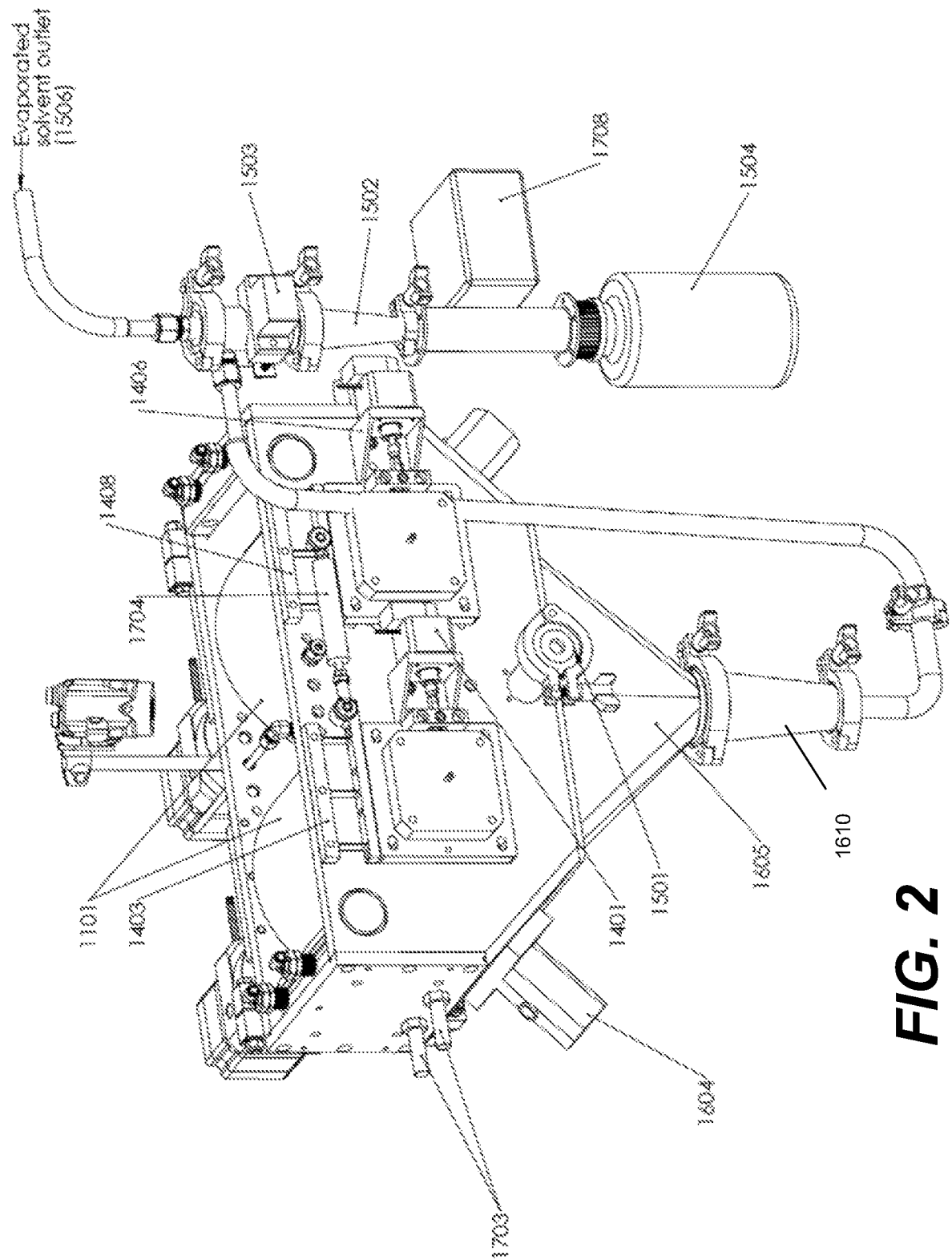
FIG. 2 is a technical drawing showing a front view of a drum dryer according to an aspect of the present disclosure. The aspect depicts the rotatable drums 1101, a gap adjustment sub-assembly comprising a flexure 1403, a linear position sensor 1704, and a front actuator 1401. In addition, it shows a cyclonic separator 1502 and collection bottle 1504.
Figure 3:
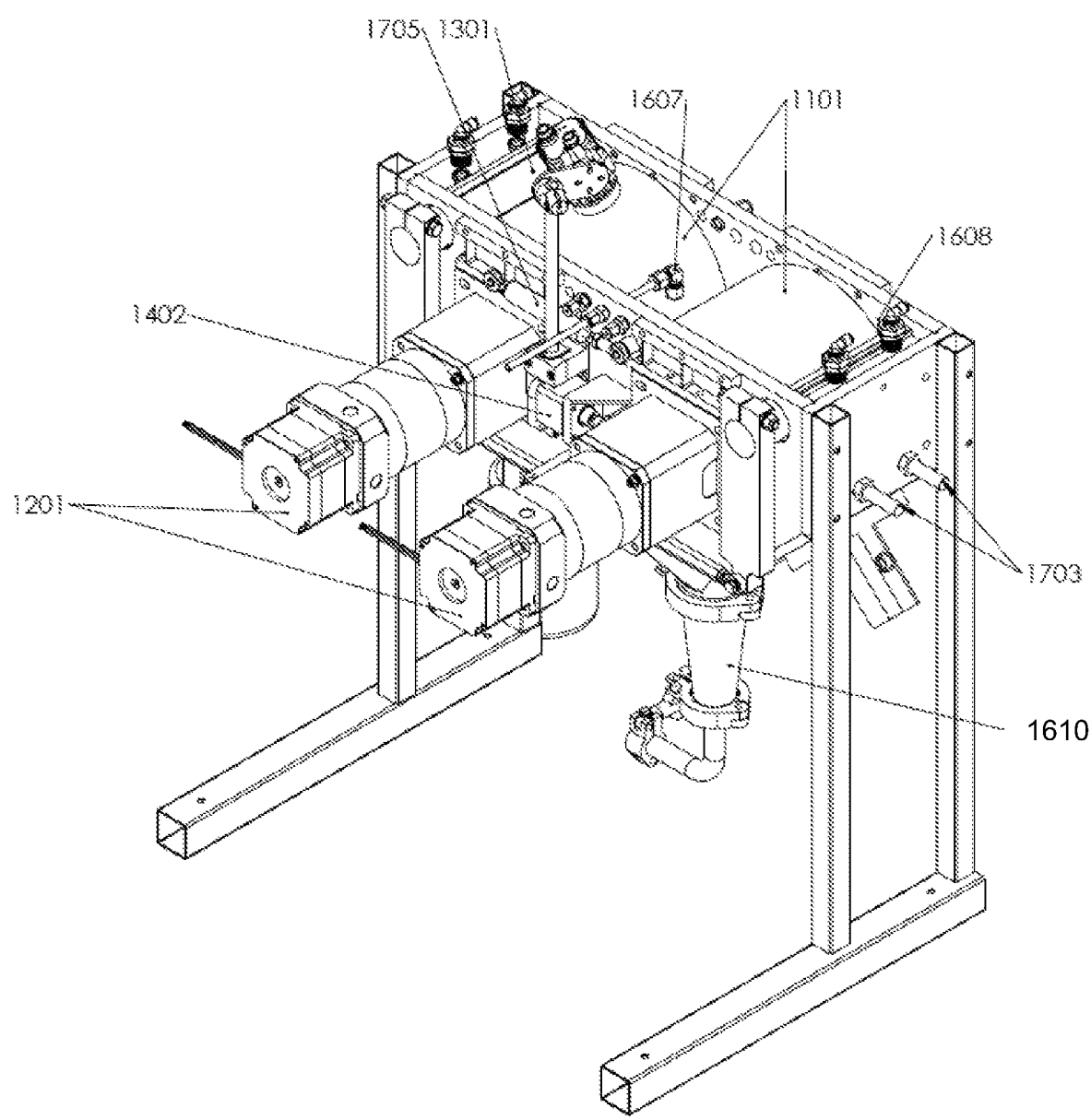
FIG. 3 is a technical drawing showing a rear view of a drum dryer according to an aspect of the present disclosure. The aspect depicts the rotatable drums 1101, a drum roller drive motors 1201 or drive assembly 1200, and a slurry feed tube 1607. In addition, it shows linear position sensor 1705 and infrared temperature sensors 1703.
Figure 4:
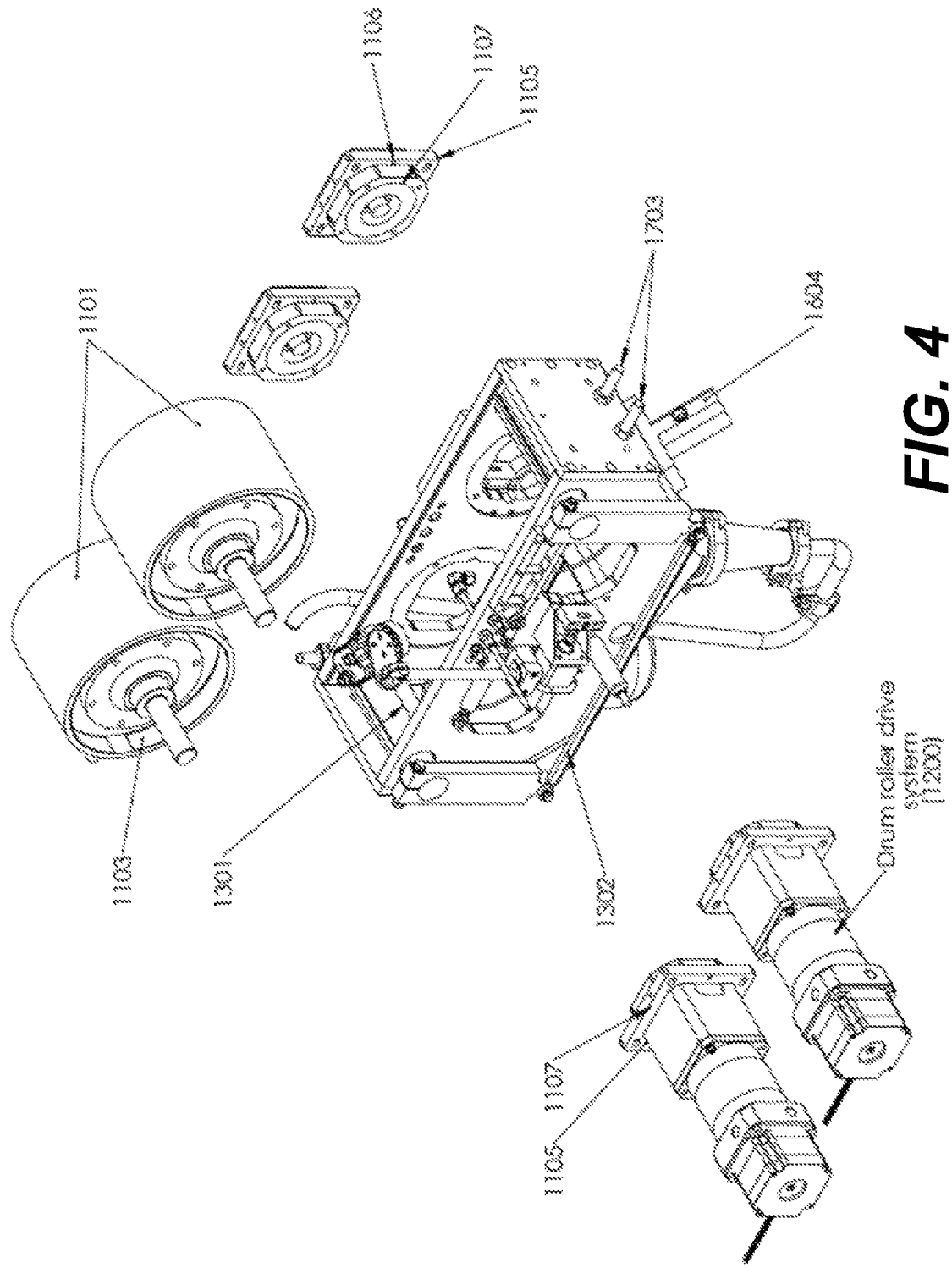
FIG. 4 is a technical drawing showing a rear view of a drum dryer showing the drum assembly removed according to an aspect of the present disclosure. The aspect depicts the rotatable drums 1101, an outer drum heater 1103, a bearing block 1105, a slip ring, seal 1106 and a drum bearing 1107.

A drum dryer according to the present disclosure is further illustrated in FIG. 2 and FIG. 3. As shown, a continuous drying apparatus comprises a housing assembly, a slurry inlet 1607, a first and second rotatable drum 1101, a drum gap assembly, a scraper assembly, an evaporated solvent outlet, and an outlet to the collection vessel 1504.

Figure 5:
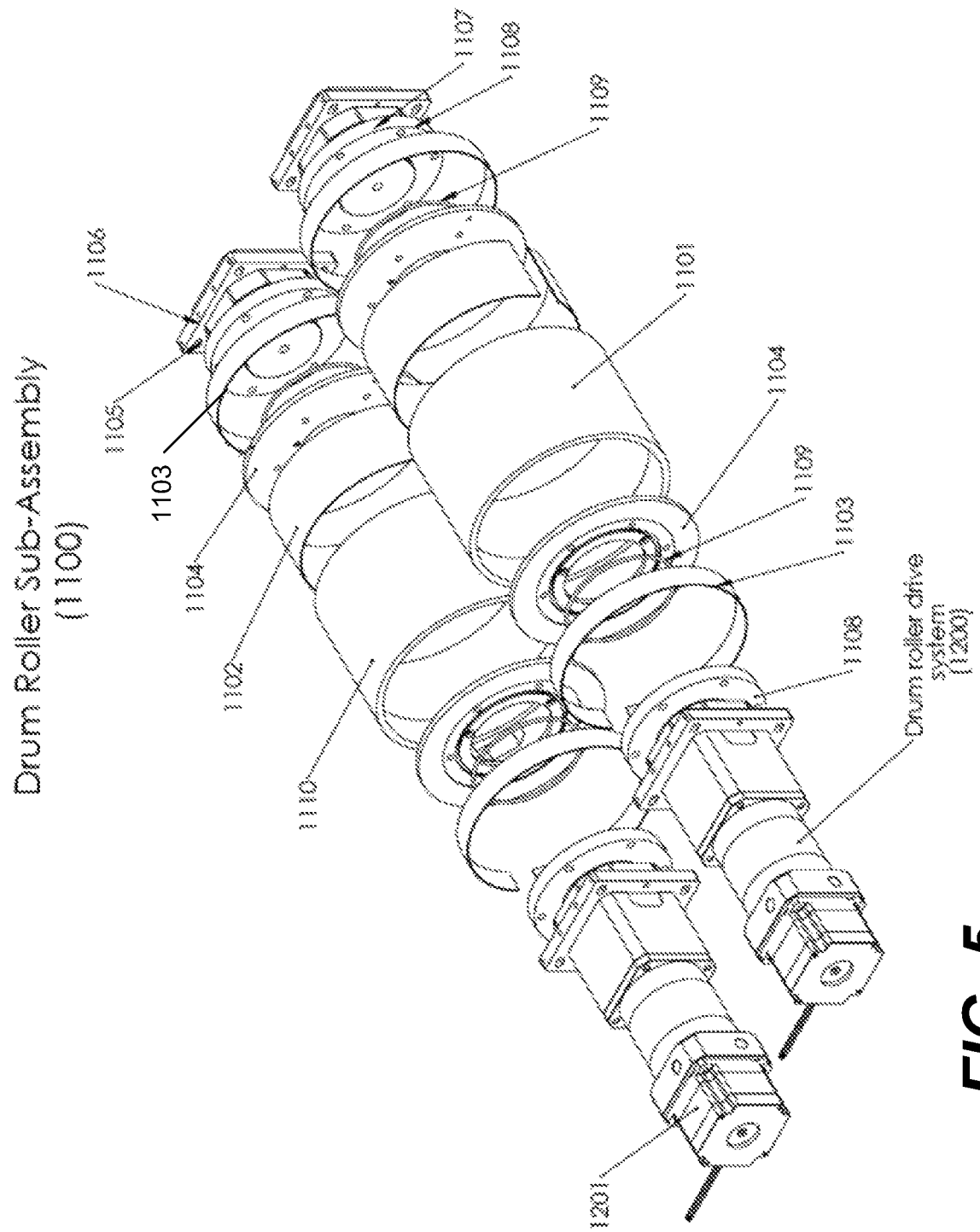
FIG. 5 is a technical drawing showing an exploded view of a drum assembly according to an aspect of the present disclosure. The aspect depicts an exploded rear view of a dryer's drive system and drum rollers. Particularly the center and outer drum heaters 1102 and 1103, respectively.

A suitable drum assembly 1100 is presented in FIG. 5. Drum assemblies 1100 are used as a pair. As shown in an aspect according to FIG. 5, the drum assembly has drum roller 1101, heater 1102, outer drum heater 1103, drum flange 1104, bearing block 1105, slip ring seal 1106 drum bearing 1107, drum seal/shaft 1108, and drum sealing o-ring 1109. The drum assembly as shown includes a drum roller drive system 1200. In an aspect each motor assembly includes an electric motor. In an aspect the motor assembly comprises a stepper motor. Other suitable motors are known in the art.

As shown in FIG. 5, a continuous drum dryer of the present disclosure can incorporate two drum roller drive systems 1200, each independently driving a drum assembly 1100. Also provided for, and included in the present disclosure are configurations of a continuous drum dryer incorporating a single drum roller drive system 1200. In an aspect, the drum roller drive system 1200 can be mounted to the back of one drum assembly 1100 and connected to the second drum assembly 1100 by a belt, chain, gear, or other suitable means to drive the simultaneous rotation of the two drum assemblies 1100. In other aspects, the drum roller drive system 1200 can be mounted to the side of the continuous drum dryer and connected to the second drum assembly 1100 by a belt, chain, gear, or other suitable means to drive the simultaneous rotation of the two drum assemblies 1100. Other configurations include top or bottom mounting arrangements of the drum roller drive system 1200 as appropriate to minimize space. Also included and provided for, are a continuous drum dryers having the drum roller drive system 1200 mounted internally to the second drum assembly 1100. In an aspect, a single drum roller drive system 1200 can be mounted internally in a first second drum assembly 1100 and connected by a belt, chain, gear, or other suitable means to drive the simultaneous rotation of the two drum assemblies 1100.

As shown in the drawings, for example FIGS. 5, 7, 8, and 10, the drum assemblies 1100 may include a drum bearing 1107 and a slip ring seal 1106 on one side of the drum roller 1101 and a drum seal/shaft and drum sealing o-ring 1109 on the other side of drum roller 1101. In such an aspect, the rotatable drums are supported on both ends of the axis of rotation and accordingly includes a front actuator 1401 and rear actuator 1402 for providing an adjustable gap 1410. In an alternative aspect, the present disclosure provides for, and includes a continuous drum dryer having each of the drum assemblies 1100 mounted on a single drum seal/shaft 1108 and drum sealing o-ring 1109 and having a seal on the opposite side to prevent leakage. In such aspects, only a single actuator is required to provide for an adjustable gap 1410. As discussed above both dual mount and single mount drum roller configurations can be provided with either single or dual drum roller drive systems 1200.

In aspects according to the present disclosure, the drum dryer includes and provides for dryer drums having an evaporative surface. In aspects according to the present disclosure, the evaporative surface can be a combined evaporative surface area of between 250 cm$^2$ and 4×10$^6$ cm$^2$. The size of the evaporative surface area being selectable depending on the desired throughput of the overall continuous production system. In an aspect, the combined evaporative surface area is between about 63 cm$^2$ and 3.9×10$^6$ cm$^2$. In other aspects the combined evaporative surface area is between about 63 cm$^2$ and 5,000 cm$^2$. In yet other aspects the combined evaporative surface area is between about 63 cm$^2$ and 3.9×10$^6$ cm$^2$. In further aspects, the combined evaporative surface area is between about 63 cm$^2$ and 5,000 cm$^2$. The present disclosure provides for and includes for paired dryer drums having a combined evaporative surface area of between about 63 cm$^2$ and 2,500 cm$^2$. In an aspect, the combined evaporative surface area is about 2,500 cm$^2$. In other aspects, the combined evaporative surface area is about 1000 cm$^2$. On a further aspect, combined evaporative surface area is about 2000 cm$^2$. In some aspects the combined evaporative surface area is about 3,000 cm$^2$.

The present disclosure provides for and includes, rotatable drums 1101 having a diameter of between 8 cm and 1,000 cm and a length between about 2.0 cm and 1,000 cm. In an aspect, the diameter of the rotatable drums 1101 are between 5 and 35 cm. In yet other aspects, the diameter of the rotatable drums 1101 are between 5 and 25 cm. In another aspect, the diameter of the rotatable drums 1101 are about 20 cm. In an aspect, the diameter of the rotatable drums 1101 is about 15 cm. In yet another aspect, the diameter of the rotatable drums 1101 is about 10 cm. The present disclosure provides for rotatable drums 1101 having a length of between 2 and 1000 cm. The present disclosure provides for rotatable drums 1101 having a length of between 10 and 100 cm. In other aspects the length of the rotatable drums 1101 is between 25 and 75 cm. In some aspects, the length of the rotatable drums are between 40 and 60 cm. The present disclosure provides for rotatable drums having a diameter of between 5 and 25 cm and a length of between 40 and 60 cm. The present disclosure provides for rotatable drums having a diameter of between 5 and 15 cm and a length of between 40 and 60 cm. Suitable exemplary sizes and dimensions of drum dryers according to the present disclosure are illustrated in Table 1.

Table 1. Exemplary Drum Dryer Dimensions

TABLE 1

Exemplary Drum Dryer Dimensions

| | Drum Dryers | | |
|---|---|---|---|
| | Current | Minimum | Minimum |
| Drum size | | | |
| radius (cm) | 11 | 4 | 500 |
| diameter (cm) | 22 | 8 | 1,000 |
| length (cm) | 15 | 2 | 1,000 |
| surface area (cm$^2$) | 2073 | 101 | 6,283,180 |
| evaporative surface (cm$^2$) | 1296 | 63 | 3,928,124 |
| Dryer Footprint | | | |
| width (cm) | 61 | 22 | 2,771 |
| depth (cm) | 61 | 12 | 1,200 |
| area (cm$^2$) | 3716 | 266 | 3,325,091 |

In addition to providing a sufficient combined evaporative surface area for drying a slurry, the present disclosure provides for and includes a rotatable drum 1101 comprising a surface that is solvent resistant, resists oxidation or reduction, and galling. As provided herein, the rotatable drum may be formed entirely of a single suitable material, or may comprise a surface coated rotatable drum 1101. Suitable materials include lightweight materials. In an aspect, the suitable material hard anodized aluminum (Type III). In aspects according to the present disclosure, a suitable material is one that is resistant to the liquids and solids found in the slurry to be applied. Accordingly, the appropriate choice of materials for the preparation of a rotatable drum 1101 (as well as other components of a continuous drying apparatus in contact with the slurry or slurry components) may be determined by the slurry itself. In many aspects, the components of a continuous drying apparatus are constructed from materials that have a broad resistance to corrosion, undesirable reactions, and degradation. In further aspects, suitable materials are selected that further provide for strength (e.g., tensile strength and elastic strength) to prevent scoring, scratching and galling. As provided herein, suitable materials include but are not limited to steel, carbon steel, stainless steel and titanium. In some aspects, a suitable material for the preparation of rotatable drums 1101 have a Young's Modulus of elasticity of at least 69 GPa/$1.0 \times 10^7$ psi.

In an aspect, a rotatable drum 1101 can be prepared from a lightweight metal or metal alloy. In an aspect, the rotatable drum 1101 can prepared from aluminum. In another aspect, a rotatable drum 1101 is prepared from steel or stainless steel. In other aspects, a rotatable drum 1101 is prepared from carbon steel.

Also included in the present disclosure are rotatable drums 1101 that are prepared from metal alloys. In an aspect, the metal alloy may be a cobalt based alloy, including for example ULTIMET® a cobalt-based alloy produced by Haynes International, Inc. (available on the internet www.haynesintl.com/UltimetAlloy.htm) and having the following composition: 54% Cobalt (as balance), 26% Chromium, 9% Nickel, 5% Molybdenum, 3% Iron, 2% Tungsten, 0.8% Manganese, 0.3% Silicon 0.08% Nitrogen and 0.06% Carbon. Another suitable cobalt based alloy includes STELLITE® an alloy produced by the Kennametal Stellite Company (available on the internet at www.stellite.com/alloydatabase/nominal.asp). An alloy suitable for the preparation of rotatable drums 1101 also include HASTELLOY® manufactured by Haynes International, Inc. (available on the internet at http://www.haynesintl.com/CRAlloys.htm). Another suitable alloy for use in preparing a rotatable drum 1101 is MONEL®, a nickel alloy available from Special Metals Corporation (owned by Precision Castparts Corporation). In another aspect, a rotatable drum 1101 can be prepared from NIMONIC®, a nickel-chromium alloy, INCONEL® a nickel-chromium alloy, or INCALOY® a nickel-iron allow, all of which are available from Special Metals Corporation.

In addition to metal and metal alloy based rotatable drums 1101, the present disclosure provides for and includes rotatable drums 1101 prepared from one or more polymers. In certain aspects, polymers provide for improved chemical resistance. In other aspects, polymers provide for decreased adhesion of the dried solid to the drums thereby easing the scraping and recovery step. In other aspects, the polymers are selected to increase adhesion and provide for improved contact with the drying surface. Retention on the drying surface can facilitate decreased residual liquid in a dried solid. Suitable polymers include polyoxymethylene (e.g., DELRIN®), polyimide (e.g., KAPTON®), polyether ether keton (PEEK), polyaryletherketone (PAEK), polyethylene terephthalate (PET), polycarbonate and others. Suitable polymers have a modulus of elasticity (Young's modulus (E)) of between 0.3 GPa/$4.5 \times 10^4$ psi and 3.6 GPa/$5.4 \times 10^5$ psi MPa.

The present disclosure provides for and includes for rotatable drums 1101 that are coated rotatable drums 1101. The present disclosure further provides for a rotatable drum 1101 having surface that provides for adhesion of the solid. In other aspects, the rotatable drum 1101 has a surface that prevents adhesion of the solid present in the slurry. In aspects according to the present disclosure, a rotatable drum 1101 is coated with a material to provide for improved performance. In an aspect, a rotatable drum 1101 is a metal drum coated with a material that improves the adhesion of the solid to the evaporative surface. In other aspects, the rotatable drum is coated to decrease the adhesion of the dried solid to the evaporative surface. In an aspect, the rotatable drum 1101 is coated with Teflon. In other aspects, the rotatable drum 1101 may be coated with a polymer as provided above.

In addition to hardness, thermal conductivity, resistance to corrosion, suitable materials may be selected that promote or resist the adhesion of the solid in the slurry. Increased adhesion provides for increasing the contact time of the solid with the drum drying to decrease overall level of liquid in the dried material. In certain aspects, increased adhesion is provided to prevent the slippage of the slurry through the gap.

As used herein, a "slurry: is a mixture of solid particles suspended in a carrier liquid. As used herein, a "carrier liquid" refers to the liquid that is to be removed from the slurry to produce a dried solid, cake, particle, or granule. The term liquid and solvent are used interchangeably throughout the specification to refer to carrier liquids that are removed during the drying process. The solid particles of the slurry generally have low solubility in the carrier liquids and the carrier liquids are volatile so that they can be removed by evaporation during the drying process.

As discussed above, the present disclosure provides for a rotatable drum 1101 having a surface that is compatible with solids and liquids found in a slurry. As provided herein, the evaporative surface may comprise the same material as the rotatable drum 1101 or may be an applied as a coating or a layer to a rotatable drum 1101. In aspects according to the present disclosure, the surface of the rotatable drums 1101 is compatible with organic solvents (e.g., organic carrier liquids). In other aspects, the rotatable drum 1101 has a surface that is compatible with aqueous solvents (e.g., aqueous carrier liquids). In yet other aspects, the rotatable drum 1101 has a surface that is resistant to a liquid or solvent including, but not limited to acetic acid, acetone, acetonitrile, benzene, 1-butanol, 2-butanol, 2-butanone, t butyl alcohol, carbon tetrachloride, chlorobenzene, chloroform, cyclohexane, 1,2-dichloroethane, diethylene glycol, diethyl ether, diglyme, 1,2-dimethoxyethane, dimethyl formamide, dimethyl sulfoxide, 1, 4-dioxane, ethanol, ethyl acetate, ethylene glycol, heptane, hexane, methanol, methyl t-butyl ether, methylene chloride, N-methyl-2-pyrrolidinone, nitromethane, pentane, ligroine, 1-propanol, 2-propanol, pyridine, tetrahydrofuran, toluene, triethylamine, water, o-xylene, m-xylene, p-xylene, and combinations thereof.

Also included and provided for in the present disclosure, are drum materials that are resistant to wear. More specifically, as the continuous drying apparatus is expected to be implemented into a continuous manufacturing process that could run for weeks, months, or longer, it is important to prevent any materials of the drum drying apparatus itself from wearing and entering into the resultant product (it may also be implemented into a semi-continuous or batch manufacturing line). As provided in the present specification, the dried solid is removed by a scraper (or brush) that is in contact with the evaporative surface of the rotatable drum 1101. Accordingly, both the drum surface and the composition of the scraper must be selected not only to be resistant to the solids and liquids of the slurry, but also resistant to mechanical wear and compatible with each other. Suitable materials are known in the art and include, for example, a metal or metal alloy rotatable drum and a scraper blade 1301 prepared from a polymer, for example polyacetyl or other hard, solvent compatible plastic as discussed below. Additional suitable coatings are provided in the paragraphs below.

In aspects according to the present disclosure, the continuous drying apparatus can be configured to have an adjustable gap 1410 so that the thickness of the layer of slurry applied to the evaporative surfaces of the rotatable drums 1101 can be controlled. An adjustable gap 1410 also provides for accommodating different slurry flow rates through the continuous drying apparatus (as long as the slurry is dried to an appropriate level) and thereby provides additional flexibility in the overall process control of a continuous production system. In certain aspects, the continuous drying apparatus provides for closing the adjustable gap 1410 for a period. In a closed setting, the flow of slurry through the system may be temporarily halted, for example to provide for a thorough cleaning out of the dried material. The adjustable gap 1410 can then be re-opened without interrupting the overall continuous manufacturing process. As will be understood by a person of ordinary skill in the art, the properties of a slurry can vary considerably and can depend on the following non-limiting considerations: the nature of the solid and liquid, the ratio of solid to liquid, the adhesion of the liquid and solid to the evaporative surface, the vapor pressure and heat of vaporization of the liquid, the flow rate of the slurry, the drum temperature, the housing pressure, the drum rotation speed, the slurry viscosity, crystal morphology, etc.

By increasing the gap 1410 between the rotatable drums 1101, the continuous drying apparatus can accommodate higher slurry flow rates (as long as the slurry is dried to the appropriate level) the rate of slurry processing. An increase gap 1410 also provides for improved processing of more viscous slurries. In another aspect, the adjustable gap 1410 provides for the accommodation of input slurries having increased granularity. In other aspects, decreasing the drum gap 1410 provides for a thinner deposition of slurry onto the evaporative surfaces of the drums and thereby decreasing the amount of time required to dry the solid material to the desired dryness. The adjustable gap 1410 also provides for the overall drying process to be adjusted to changes in the overall continuous production process, or corresponding semi-continuous or batch process. That is, the throughput of the continuous drying apparatus can be increased, for example, to accommodate temporary upstream increases in production and decreased to prevent downstream processes from being overwhelmed by upstream inputs. The adjustable gap 1410 also provides for the in-line adjustment of the process to accommodate fluctuations in viscosity and granularity during a continuous production process (or a semi-continuous or batch process).

In addition to providing increased control of the drying process in a continuous production system (or a semi-continuous or batch production system), the present disclosure provides for rapid optimization of a slurry drying process. As provided herein, the adjustment of the drum gap 1410 can increase or decrease the contact of the slurry with the evaporative surface to accommodate different solids, different liquids, different ratios. Moreover, as provided herein, the gap 1410 can be adjusted during processing without having to stop operations to make adjustments. Prior to the present disclosure, the drums of a drum drying apparatus were separated by a fixed distance and were unable to adjust in real-time for changes in the input streams such as in viscosity and granularity. An adjustable gap 1410 also provides for a single continuous drying device to be configured and used in the production of different dried materials (e.g., different APIs).

The present disclosure provides for, and includes, a continuous drying apparatus having an adjustable drum gap 1410. In certain aspects, the adjustable drum gap 1410 can be adjusted by holding one of the two rotatable drums 1101 fixed and providing for the lateral movement of a movable rotatable drum 1101. In an alternative aspect, the adjustable drum gap 1410 can be adjusted using two movable rotatable drums 1101. Referring to FIGS. 12A and 12B, in certain aspects, the drum gap 1410 is controlled by a drum gap adjustment assembly 1400 (shown in FIGS. 12 and 13) including a first and second front actuator 1401 (shown in FIG. 14) and a first and second rear actuator 1402 (shown in FIG. 14) attached to a movable two rotatable drums 1101 respectively. The adjustment mechanism further includes a flexure 1403, a front linear position sensor 1704 and a rear linear position sensor 1705 that provide for detecting the drum gap 1410 distance. In aspects having a fixed rotatable drum 1101, the second front and rear actuators 1401 and 1402 are replaced by fittings that fix the position of the rotatable drum 1101. As provided by the present disclosure, the drum gap assembly may further include one or more linear position sensors 1704 and 1705 to provide for real time monitoring of the gap 1410 distance. As will be appreciated by those of skill in the art, the adjustment of the movable rotatable drum requires that the front and rear actuators 1401 and 1402 be synchronized to maintain the parallelism of the evaporative surfaces of the rotatable drums 1101.

The present disclosure provides for an adjustable gap assembly 1400 that allows the gap 1410 between the drums to be adjusted from between 25 micrometers ($\mu m$) (e.g., 0.025 mm) to 2.5 mm. In certain aspects, the drum gap assembly 1400 provides for closing the gap 1410 completely for a period without disrupting the overall continuous drying process. As provided herein, the gap 1410 may be decreased to accommodate slurries of lower viscosity or lower percent solids so that the slurry is prevented from falling straight through. The present disclosure also provides for and includes adjustments to the gap 1410 depending on the speed of the rotating drums, the vapor pressure of the liquid, the pressure of the housing and other factors that affect the properties of the slurry and the rate of drying. In an aspect, the adjustable gap 1410 is adjustable between 25 $\mu m$ and 50 $\mu m$. In another aspect, the gap is adjustable between 25 $\mu m$ and 100 $\mu m$. In other aspects, the adjustable gap 1410 is adjustable between 50 $\mu m$ and 100 $\mu m$. Other aspects provide for a gap 1410 of between 75 $\mu m$ and 150 $\mu m$. In certain aspects, the adjustable gap 1410 is adjustable between 0.1 mm and 1 mm. In yet other aspects, the gap 1410 is adjustable between 0.1 and 0.5 mm. In certain aspects, the gap 1410 is adjustable to about 0.2 mm.

The present disclosure further provides for, and includes, an adjustable gap assembly 1400 that allows the gap 1410 between the drums to be adjusted from between 25 micrometers ($\mu m$) to 1.0 mm. The ability to adjust the gap 1410 provides for reducing the size of the resulting dried solid during the drying process and thereby eliminate the need for subsequence milling. This improvement improves flowability of the dried material and provides for a reduction in the number of steps in a continuous manufacturing process. In an aspect, the gap 1410 is maintained at a constant distance to prepare a dried solid with a reduced particle size. In an aspect, the gap 1410 is controlled to provide for particle size reduction of the dried product by providing for the application of a constant pressure between the drums. As provided herein, by controlling the gap 1410 during the drying process, a constant pressure is applied between the drums to cause particle breakage. Accordingly, the continuous drying apparatus further includes a load cell, for example, as part of the linear position sensors 1704 and 1705. Alternatively, a load cell sensor can be separately incorporated into the continuous drying apparatus to maintain a constant pressure on the drying solid and ensure that the dried solid is produced having a reduced particle size. As provided herein, a load cell suitable for incorporation into a continuous drying apparatus may be a hydraulic load cell. In another aspect, a load cell suitable for incorporation into a continuous drying apparatus may be a pneumatic load cell. In another aspect, a load cell suitable for incorporation into a continuous drying apparatus may be a strain-gage load cell. Also included and provided for by the present disclosure is incorporation load sensing into the process control and processes monitoring system. In aspects, of the present disclosure, the gap 1410 is adjusted to prevent the slurry from passing through the gap undried (empirically determined based on slurry viscosity and percent solids, the drum rotation speed, the vapor pressure of the liquid, the housing pressure) and further adjusted to maintain a constant pressure between the drums 1101 surfaces.

In another aspect, the adjustable assembly 1400 provides a gap 1410 of 3.0 mm or less. In certain aspects, the adjustable gap assembly provides for the drums to contact and close the gap 1410 completely. In other aspects, the gap 1410 is limited to within about 0.025 mm to avoid drum contact. In an aspect, the gap 1410 is limited to 0.05 mm or greater. The adjustable gap assembly provides for the gap 1410 to be adjusted in increments of about 0.01 or greater. The ability to adjust the gap 1410 in small increments improves the control of the size of the resulting dried particles and has significant benefits to a continuous manufacturing process, including, but not limited to, improving the flow-ability of the dried material and the elimination of milling.

The present disclosure provides for, and includes, a scraper assembly providing a scraper blade 1301 and further providing for maintaining contact with the two rotatable drums 1101. As used herein, a scraper blade 1301 refers to a flat, solid device that contacts the evaporative surface of the rotatable drums 1101 or a brush. A scraper blade contacts the evaporative surface and removes the dried solid which then drops by gravity towards the hopper 1605 (see FIG. 6). In some aspects, the scraper blade further includes an angled surface to provide an edge for removing the dried solid. The scraper blade 1301 (or brush) can be prepared from any durable material that does not cause wear to the evaporative surface of the rotatable drums 1101. In addition to being selected to avoid wear, scratching or damage to the evaporative surface, a scraper blade 1301 (or brush) is prepared from materials that are relatively inert and resistant to the liquids and solids present in a slurry to be dried. In aspects according to the present disclosure, a scraper blade 1301 comprises a corrosion-resistant metals. In an aspect, a corrosion-resistant scraper blade 1301 is prepared from stainless steel 316, hastelloy, Inconel, monel, titanium, or tantalum.

The present disclosure provides for, and includes, a solid scraper blade 1301 fabricated from any of a variety of pliable elastomeric/plastic materials including food and non-food grade polyethylene, polyurethane, polypropylene, polyvinyl-chloride (PVC), PTFE (Teflon™), nylon, oil-filled UHMW-PE (ultra-high molecular weight polyethylene), polyoxymethylene (e.g., polyacetal, or DELRIN®), a copolyester (e.g., TPC-ET thermoplastic elastomer or Hytrel®), and other suitable materials. In certain aspects a scraper blade 1301 is prepared from materials that have a high stiffness and low friction when applied against the evaporative surface. In certain aspects, a scraper blade 1301 is prepared from polyoxymethylene. In an aspect, the polyoxymethylene is a stabilized polyoxymethylene having ether chain end groups. In certain aspects the stabilized polyoxymethylene further comprises an antioxidant.

In aspects according to the present disclosure a scraper blade 1301 is prepared from materials that are resistant to chemical degradation (for example solvation, oxidation, reduction, hydrolysis). As provided herein, a scraper blade 1301 is resistant to degradation when exposed to slurry liquids including, but not limited to, acetic acid, acetone, acetonitrile, benzene, 1-butanol, 2-butanol, 2-butanone, t butyl alcohol, carbon tetrachloride, chlorobenzene, chloroform, cyclohexane, 1,2-dichloroethane, diethylene glycol, diethyl ether, diglyme, 1,2-dimethoxyethane, dimethyl formamide, dimethyl sulfoxide, 1, 4-dioxane, ethanol, ethyl acetate, ethylene glycol, heptane, hexane, methanol, methyl t-butyl ether, methylene chloride, N-methyl-2-pyrrolidinone, nitromethane, pentane, ligroine, 1-propanol, 2-propanol, pyridine, tetrahydrofuran, toluene, triethylamine, water, o-xylene, m-xylene, p-xylene, and combinations thereof. Suitable materials that are resistant to other solvents, liquids and compounds are known in the art and can be selected by a person of skill in the art.

Figure 8:
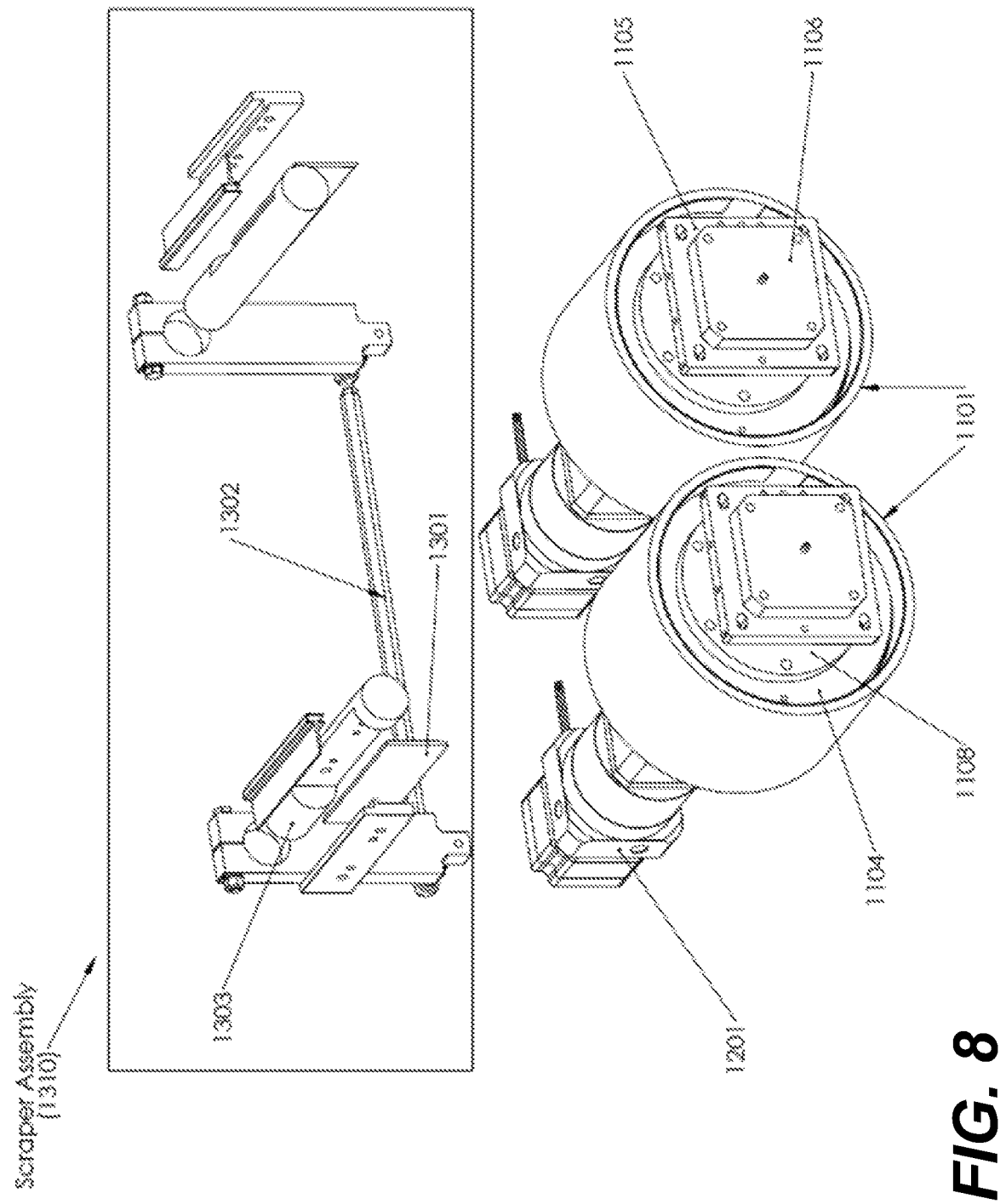
FIG. 8 is a technical drawing showing an exploded view of a scraper assembly 1310 according an aspect of the present disclosure. This aspect depicts a scraper blade sub-assembly comprising a scraper blade adjuster/Surgeon's bar 1302, a scraper blade 1301 and shows how a scraper blade shaft 1303 connects the two. The rotatable drums 1101 are lowered to better view the bar connecting both scraper blade adjusters.

In aspects according to the present disclosure, the continuous drying apparatus may include an adjustable drum gap assembly. According to aspects of the continuous drying apparatus capable of adjustable drum gaps, the continuous drying apparatus further includes an adjustable scraper assembly (see FIG. 8). In an aspect, the distance of the two scraper blades 1301 is adjustable to provide for a constant angle of contact and constant pressure against the rotatable drums 1101. Referring to FIG. 8, in an aspect, the scraper blade assembly includes a rotatable scraper blade shaft 1303 that provides for rotation of the scraper blade 1301 as the rotatable drums 1101 move laterally in, or out, to adjust the gap 1410. The rotatable scraper blade shaft may comprise a spring loaded tensioner that maintains the blade contact with the evaporative surface of the rotatable drums 1101. In another aspect, the rotatable scraper blade shaft 1303 may be connected to a motor to provide for the adjustment of the rotation of the scraper blade as well as to provide tension to the evaporative surface of the rotatable drum 1101 by the scraper blade 1301. In some aspects, the scraper blade assembly is configured to provide for lateral movement in concert with the rotatable drum 1101, including assemblies having one or two movable rotatable drums. In an aspect, the surgeons bar 1302 can be an extensible connecting bar 1302 that allows for the synchronized extension in concert with the drum adjustment sub-assembly 1400.

Figure 6:
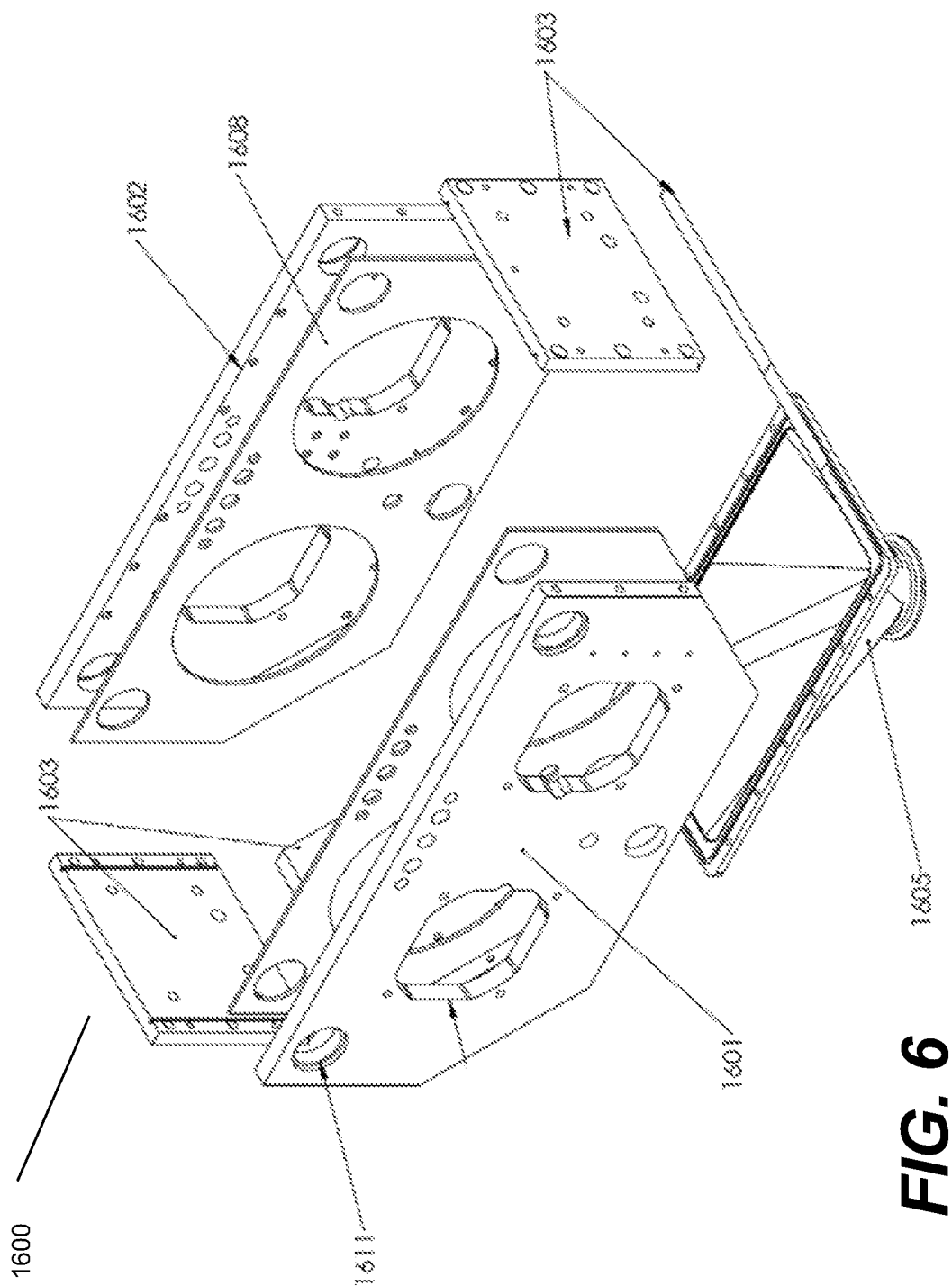
FIG. 6 is a technical drawing showing an exploded view of a housing assembly 1600 according an aspect of the present disclosure. This aspect depicts a thrust plate 1608 which forms a seal against the drums to support formation of the slurry reservoir.
Figure 7:
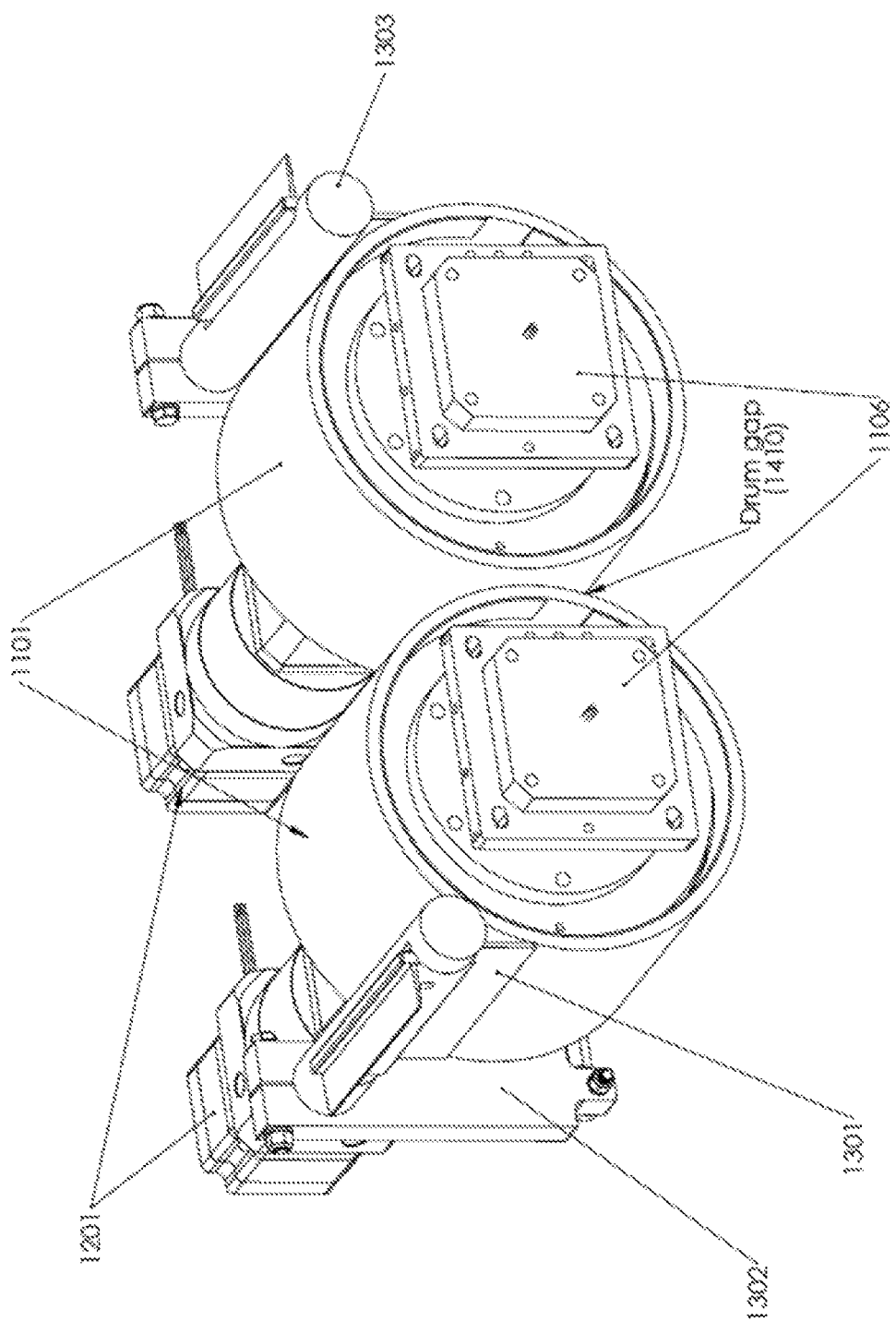
FIG. 7 is a technical drawing showing a view of a scraper assembly 1310 according an aspect of the present disclosure. This aspect depicts a scraper blade sub-assembly comprising a scraper blade adjuster 1302 and a scraper blade 1301, and illustrates the position relative to the rotatable drums 1101; This aspect further depicts a drum gap 1410.
Figure 9:
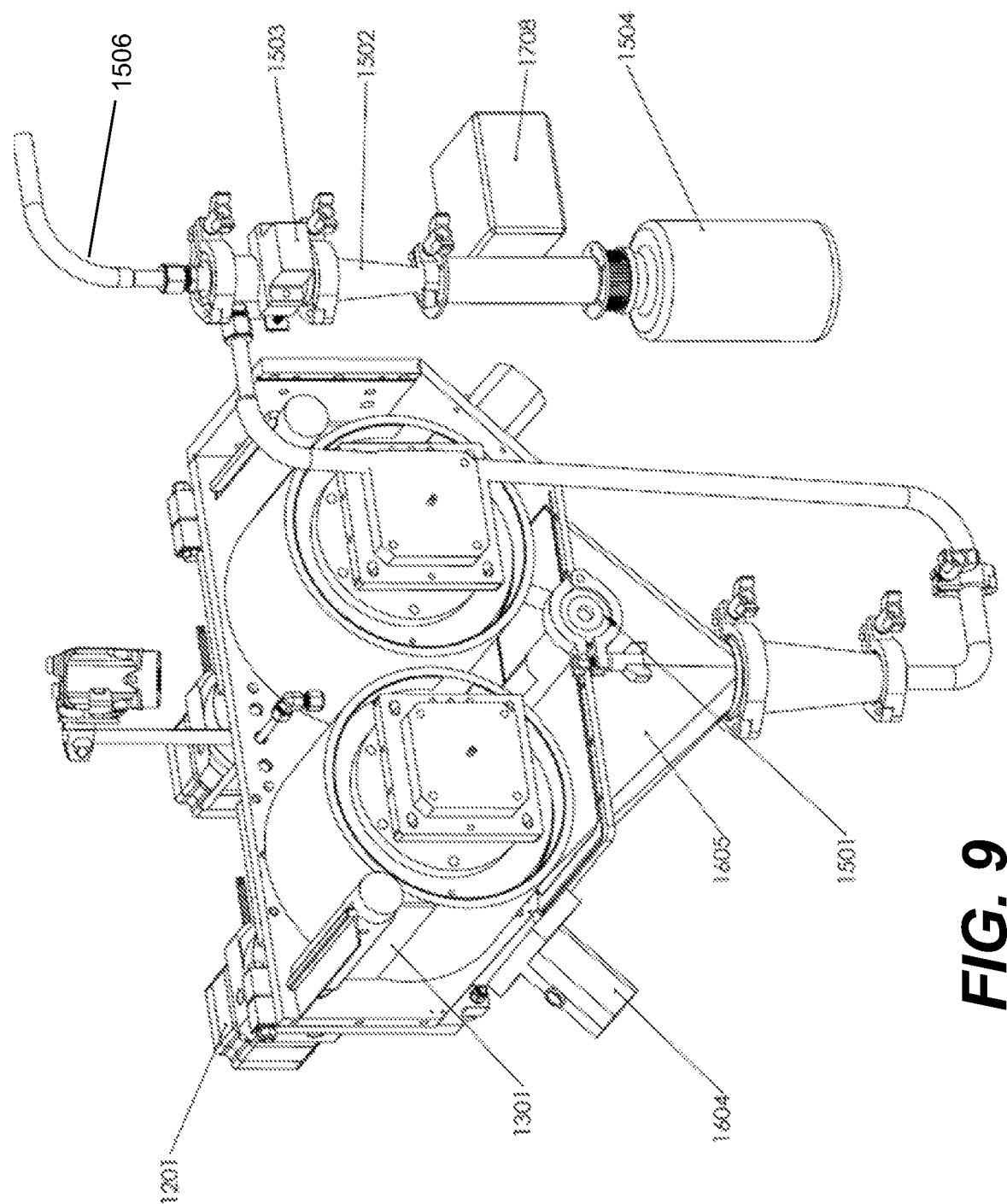
FIG. 9 is a technical drawing showing a front view of a drum dryer incorporated into a material processing system according to an aspect of the present disclosure. This aspect depicts a front view of a dryer, with the front and left sides removed to provide an unobstructed view of how the scraper blade is positioned relative to the drum roller. In addition, it shows a drip tray 1501, hopper 1605, cyclonic separator 1502, cyclone vibrator 1503, collection bottle 1504; and evaporated solvent outlet and vacuum source 1506.

The present disclosure provides for, and includes a housing enclosure and subassembly 1600. In aspects according to the disclosure, the housing assembly 1600, in addition to providing elements to mount the rotatable drum assembly, the drum drive sub-assembly, the scraper blade sub-assembly, the housing enclosure 1600 further provide for a drying environment having reduced pressure. Referring to FIG. 2, the housing enclosure 1600 includes a hopper 1605 in fluid communication with a material collection sub-assembly including a cyclonic separator 1502, a cyclone vibrator 1503, a collection bottle 1504, and a vacuum source 1506. Referring to FIG. 9, aspects of the housing enclosure 1600 include a hopper section 1605 and side vibrators 1604 that, when activated, aid the flow of the dried solid towards the housing outlet. In certain aspects the housing outlet serves as an outlet for both the dried solid obtained from the slurry and also as the outlet for the evaporated liquid. In some aspects, the housing enclosure further includes one or more vacuum outlets to maintain a pressure below ambient pressure. See FIG. 6, items 1601, 1602, 1608 as potential sites for these additional vacuum outlets. In certain aspects, the one or more vacuum outlets are placed at the top of the housing enclosure as shown in FIG. 6 to provide for the maintenance of a vacuum while avoiding the loss of dried solid material. By placing the vacuum outlet in the space above the scraper, the housing enclosure can be separated into essentially two regions: a slurry input region and a dried solid output region. In a preferred embodiment, the vacuum outlet is located under the scraper, in the dried solid output region.

In general, the vacuum within the two regions of the housing enclosure is maintained at an equal pressure. In other aspects the vacuum in the slurry input region can be greater (e.g., lower pressure) than the vacuum in the dried solid output region. In yet other aspects, the vacuum in the dried solid output region is maintained at a lower pressure than the vacuum in the slurry input region. Thus, the drying process can be enhanced by evaporating liquid in the slurry before it gets deposited on the evaporative surfaces of the paired rotatable drums 1101.

As provided herein, housing enclosures that provide for a low pressure drying environment greatly improve and enhance the capabilities of the continuous drying apparatus. First, lowering the pressure of the drying environment provides for enhanced evaporation of the liquid. As is understood by those of skill in the art, the boiling point of a liquid decreases as the vapor pressure decreases. Thus, at a given temperature, lowering the vapor pressure results in an increase in the rate of evaporation of the liquid. Accordingly, the drying apparatus of the present disclosure having a housing enclosure that is capable of maintaining a low pressure environment can provide for drying of solids at lower temperatures. By providing lower temperatures during the drying process, the degradation of the solid material can be substantially reduced (e.g., kinetic rates of chemical reactions decrease with temperature). Similarly and for the same thermodynamic and kinetic reasons, lower temperatures during the drying process can reduce unwanted side reactions.

The present disclosure provides for, and includes, a housing 1600 capable of achieving and holding a pressure lower than the ambient environment. In aspects according to the present disclosure, the housing and apparatus are capable of maintaining a vacuum below about $1 \times 10^5$ Pascal (Pa) (e.g., about 1 atm). In an aspect, the housing and apparatus are capable of maintaining a vacuum below about $5 \times 10^4$ Pa. In another aspect, the housing and apparatus are capable of maintaining a vacuum below about $1 \times 10^4$ Pa. In aspects according to the present disclosure, the housing and apparatus are capable of maintaining a vacuum between about 10 Pa and $1 \times 10^5$ Pa.

The present disclosure further provides for a housing capable of achieving and holding a pressure lower than the ambient environment and further provides for the flow of a gas. In an aspect, the housing of the continuous drying apparatus is maintained at a pressure below about $1 \times 10^{-5}$ Pa and a gas flow is provided. As used herein, a gas is any gas that can be applied to the intermediate or API without resulting in reaction, degradation, or solvation. In aspects of the present disclosure, the gas is dry, filtered nitrogen or other suitable inert gas. In other aspects, the gas can be air, carbon dioxide, oxygen, or hydrocarbon gas. While not to be limited by theory, the combination of a lowered housing pressure and the flow of gas over the drying solid increases the rate of vaporization of the liquid by lowering the vapor pressure and by quickly removing any evaporate away from the drying surface (convective contribution).

Also provided for, and included, in the present disclosure are improvements to the collection of the dried solid materials and recovery of the liquid by housing enclosures capable of providing reduced pressures in the drying environment. As illustrated in FIG. 9, the dried solid material removed from the rotatable drum 1101 by scraper blade 1301 falls by gravity towards the hopper 1605. Aided by vacuum 1506, the solid is drawn through the line together with the evaporated liquid to a cyclonic separator that separates the liquid vapor (e.g., the 'air' stream) from the solid and deposits the solid within collection bottle 1504. Suitable cyclonic separators are known in the art, for example Buchi, model number B-290 (part number: 042884).

The present disclosure provides for, and includes, a continuous drying apparatus having a housing assembly 1600 having an angled collection base or hopper 1605. In aspects of the present disclosure, the hopper 1605 funnels the dried solid removed by the scraper blade 1301 from the rotatable drums 1101 to the first outlet 1610. In some aspects, the collection by gravity of the dried solid by the hopper 1605 is aided by one or more conveyance mechanisms to ensure quantitative recovery of the dried solid. In some aspects, the continuous drying apparatus of the present disclosure further includes one or more blades to break up agglomerates prior to passage through the solid outlet. In some aspects, the housing includes one or more vibrators 1604 to convey the dried solid towards the outlet 1610. In an aspect, the vibrator is a pneumatic vibrator. In another aspect the vibrator is an electric vibrator. In an aspect, the one or more air jets are provided to the housing convey the dried solid towards the outlet 1610. In an aspect, the air jets further include a filter to prevent contamination of the dried solid.

The present disclosure provides for and includes a continuous drying apparatus that provides for a device or devices to convey the dried solid material from the housing. In some aspects, the conveying device is a pneumatic vibrator. In other aspects, the conveying device is an auger or an impeller. In another aspect, the dried solid is conveyed by an electric vibrator. In an aspect, an ultrasonic vibrator is included to convey the solid material from the housing. As provided above, in some aspects, the solid is conveyed from the housing by an air flow provided by a vacuum or a vacuum source. Separation of the solid from the air flow can be provided by one or more cyclonic separators 1502. In aspects according the present disclosure, the housing and apparatus may further include one or more ports to provide for the inlet of a gas to provide an airflow through the outlet and to the cyclonic separator. In an aspect, the vacuum not only maintains a lower than ambient pressure but also provides for a continuous flow of air through the apparatus and a method to remove the dried solid material.

According to aspects provided for by the present disclosure, the collection of the dried solid material is further facilitated by side vibrator 1604 that act to prevent the buildup of materials within the drying apparatus by imparting vibratory energy to the solid particulate matter. Thus, accumulations of dried material can be prevented by the continuous application of a vibratory motion, or periodically the intermittent application of vibratory energy. The inclusion of one or more vibrators on the housing enclosure also provides for a non-contact mediated transport of the dried solid. Suitable vibrators are known in the art such as Findeva K16, Vibco CE-20, which can go from 2 to 20 kHz and from 10 lbs to 250 lbs. In aspects according to the present disclosure, the side vibrator 1604 and the vibrated components of the housing including the hopper 1605 are isolated from the main unit by incorporating a rubber seal and spring tensioners. By isolating the vibration from the collection components from the rest of the device reduces the potential for damage to the drum and scraper components.

Also included and provided for in the present disclosure is a thrust plate 1608 as illustrated in FIG. 6. As used herein, a thrust plate provides a surface for sealing the rotatable drums 1101 such that the slurry is limited to exiting through the gap 1410. In an aspect the thrust plate is prepared from a high strength material that is both resistant to wear and to the expected liquids and solvents present in the slurries to be dried. In addition, the thrust plate 1608 should be prepared from a material having a low coefficient of friction with the rotatable drums 1101. In some aspects, the thrust plate 1608 is comprised of polyacetal (Delrie®). In other aspects, the thrust plate 1608 can be coated with polyacetal. In another aspect, the thrust plate 1608 can be prepared from Polytetrafluoroethylene (PTFE) (Teflon®) or coated with PTFE. In another aspect, the thrust plate 1608 can be prepared from perfloroalkoxy polymer (PFA). In another aspect, the thrust plate 1608 can be prepared from fluorinated ethylene polymer (FEP). In selecting suitable materials for a thrust plate 1608, materials that could contaminate the resulting dried solid should be avoided. In an aspect, a thrust plate 1608 may be spring loaded to provide for movement when the drums and continuous drying apparatus are in use. More specifically, a spring loaded thrust plate 1608 provides for movement when the drums expand due to heating.

The present disclosure provides for, and includes a continuous drying apparatus that incorporates one or more heating elements in the rotatable drum 1101. By incorporating heating elements directly into the rotatable drums 1101, the evaporative surface can be conductively heated. Moreover, in contrast to the Novartis-MIT continuous dryer system, incorporation of a conductive heating system further provides for the incorporation of a vacuum or reduced pressure to reduce drying temperatures and times. The present system further improves on the stability and control of the drying temperature over the Novartis-MIT continuous dryer system. Use of a convective process resulted in inconsistent temperatures, instability, and a slower response time to temperature changes.

In aspects according to the present disclosure, a continuous drying apparatus includes one or more heating elements including, but not limited to, a conductive heater, a thermoelectric heater, a Peltier heater, an air heater, recirculating heating fluid, steam, infrared, RF, and combinations thereof. In certain aspects, a convective heater may be incorporated into the apparatus when a vacuum is not required. Alternatively, in certain aspects a conductive heater can be incorporated to the inside of the rotatable drums 1101 and wherein the evaporative surface of the drums may be maintained under vacuum.

Referring to FIG. 5, a rotatable drum assembly 1100 according to an aspect of the present disclosure is presented. As shown, the rotatable drum 1101 can include a center drum heater 1102. In aspect, the rotatable drum assembly 1100 includes an outer drum heater 1103. In some aspects, the rotatable drum assembly 1100 includes both an inner center drum heater 1102 and an outer drum heater 1103.

The drum heaters of the present disclosure can comprise a number of different types including induction heaters, thermoelectric resistance heaters, or Peltier-type heaters. Also included and provided for are heaters that incorporate a recirculating system in fluid communication with one or more heat transfer elements incorporated into the rotatable drum assembly 1100. In an aspect, a heated fluid or gas (including steam) can be recirculated through a center drum heater 1102, an outer drum heater 1103, or both. In aspects configured with recirculating heating systems (and cooling if necessary) the heater 1102 and 1103 conduct the heat to the rotatable drum 1101. In an aspect, the heaters 1102 and 1103 are induction heaters coupled with a suitable material for the rotatable drum 1101. In an aspect, heaters 1102 and 1103 can be incorporated into a rotatable drum 1101 having at least one inductive heating layer, typically having an iron base. In other aspects, heaters 1102 and 1103 are thermoelectric resistance heaters. In a further aspect, heaters 1102 and 1103 can be Peltier type heaters. Also included and provided for in the present disclosure, are rotatable drums 1101 that are themselves capable of inductive or thermo-resistive heating, or are Peltier devices. That the heaters 1102 and 1103 are illustrated separately in FIG. 5, for example, is not intended to limit the heating element to a separate or unintegrated aspect of the rotatable drum 1101. In aspects according to the present disclosure, the rotatable drum 1101 may include channels for a recirculating heating system.

The present disclosure provides for, and includes, other heating elements that are compatible with use in a vacuum assisted continuous drum drying apparatus including, for example, infrared and microwave heaters. Such approaches may be incorporated to the interior of a rotatable drum 1101 or may be incorporated into the housing and enclosure assembly 1600 (see FIG. 6).

Figure 10:
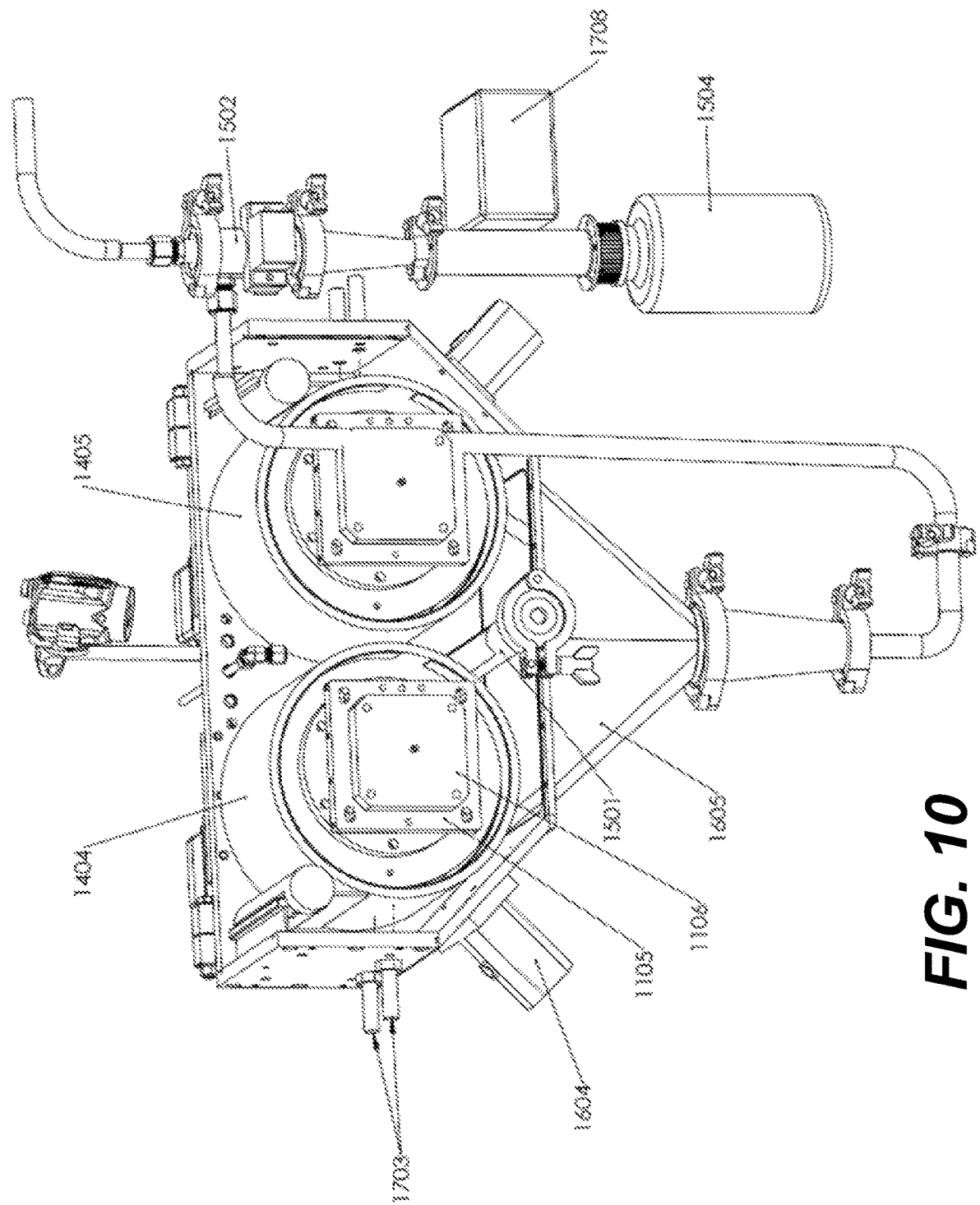
FIG. 10 is a technical drawing showing a view of a drum dryer and indicating infrared (IR) thermocouples according to an aspect of the present disclosure. This aspect depicts a front view of a dryer, with the front housing removed to provide an unobstructed view of how the infrared temperature sensors 1703 measure the temperature of the drum rollers.
Figure 11:
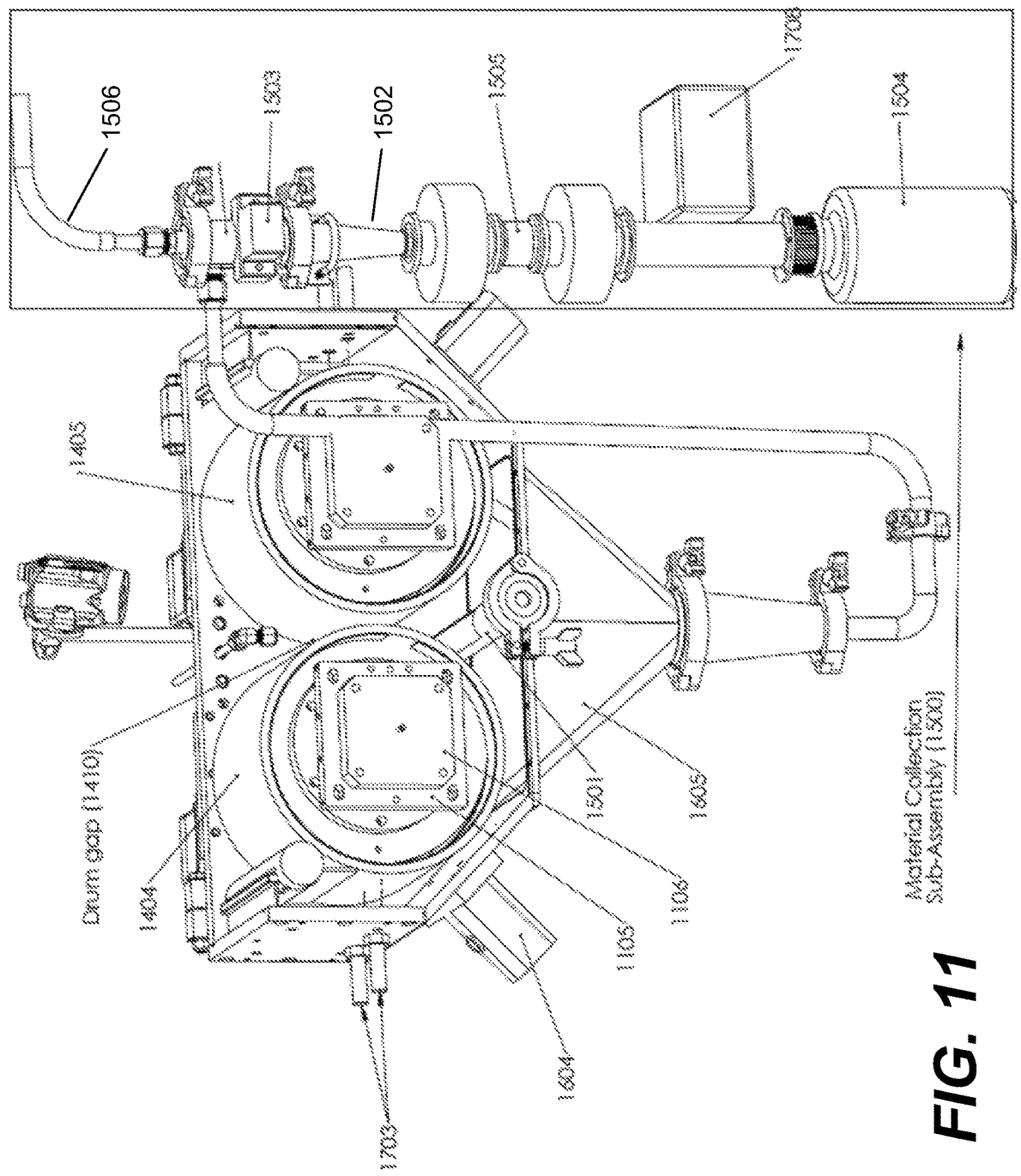
FIG. 11 is a technical drawing showing a front view of a drum dryer incorporated into a material processing system according to an aspect of the present disclosure further including a vacuum source 1506.

An advantage of the conductive heating systems provided in the present disclosure, in addition to allowing the operation of the drying apparatus under vacuum, is the ability to integrate temperature control into an overall control system. Integration of the temperature control and the use of conductive approaches improves temperature consistency and uniformity across the roller surfaces. Even further, the evaporative surfaces of the rotatable drums 1101 can be monitored using infrared temperature sensors in real-time (see for example FIG. 10 showing infrared temperature sensors 1703 for monitoring both drums). During development of the continuous drying apparatus of the present disclosure, conductive heating has been monitored over time and found to be superior to convective heating methods, because it enables operation under vacuum to achieve drying at low temperatures. As shown below in Example 1, aliskiren hemifumarate could be effectively dried ~<1% while maintaining purity at 99.6% before and after drying. In contrast, convective drying without vacuum could not attain a level of dryness below 5%. Finally, as noted, running under vacuum allows the solvent to evaporate at lower temperatures thereby reducing the rate and extent of thermal degradation and/or agglomeration.

In aspects according to the present disclosure the heating elements provide for maintaining the temperature of the evaporative surface 1110 between 25° C. and 150° C. In an aspect, the evaporative surface may be heated by the heating elements to maintain the temperature at 25° C. thereby offsetting the evaporative cooling effect of the drying process. In other aspects, the heating elements raise and maintain the temperature to increase the rate of evaporation. In an aspect, the temperature of the evaporative surface 1110 is maintained between 25° C. and 50° C. In another aspect, the temperature of the evaporative surface 1110 is maintained between 50° C. and 75° C. In another aspect, the temperature of the evaporative surface 1110 is maintained between 75° C. and 150° C.

As will be understood by one of ordinary skill in the art, the chemical characteristics of the solid in the slurry to be dried is important in considering the drying temperature. In certain aspects, thermally stable solids can be heated to 150° C. without significant risk of degradation. In other aspects, the temperature of the solid in the slurry needs to be minimized. For the latter solids, decreasing the gap 1410, increasing the vacuum and decreasing the rotation speed can be used, either alone or in combination to achieve the desired level of drying.

Among the improvements provided by and included in the present disclosure is a housing and system suitable for drying input slurries under reduced pressure. In an aspect, the apparatus may further include a vacuum pump. In other aspects, the apparatus may include one or more ports for applying a vacuum to the housing and providing a reduced pressure environment for drying. In other embodiments, an apparatus of the present disclosure includes both an integrated vacuum pump and one or more ports for applying a vacuum. In an aspect, the one or more ports for applying a vacuum comprise a second outlet in the housing. In an aspect, the second outlet is located to reduce the pressure on the slurry side of the rotatable drums 1101. In locating the vacuum port or second outlet above the first outlet (e.g., the solid outlet), the evacuation of dried solid particles can be reduced or eliminated. In some aspects, the second outlet is located on the first outlet side of the rotatable drums 1101, preferably located to minimize evacuation of dried particles.

In aspects according to the present disclosure, a vacuum pump is provided that is in fluid communication with a first outlet. In some aspects, the vacuum is a vacuum 1506 wherein the vacuum provides an airflow suitable for the separation of solid particles from the evaporated liquid in the cyclonic separator 1502. In additional aspects, the continuous drying apparatus further includes a condenser for recovering the evaporated liquid from the process stream for return and reuse in the process system or for safe disposal. In an aspect, the condenser is placed between a vacuum source 1506 and a material collection sub-assembly 1500.

With the Novartis-MIT continuous dryer system, variation in the slurry concentration resulted in inconsistent contact time with the drums, leading to slurry dripping across the rollers. Aspects of the present disclosure addresses this problem by providing for an adjustable gap 1410 as discussed above. For example, during operation, a decrease in slurry viscosity can be accommodated by decreasing the gap 1410. The housing may further include a drip tray to ensure that wet, undried slurry does not enter the dried solid collection path. As illustrated in FIGS. 2 and 9, the continuous drying apparatus of the present disclosure may include a drip tray 1501 located centrally and underneath the gap 1410. As shown, drip tray 1501 also provides for the removal of any excess, undried slurry. In an aspect, the continuous drying apparatus may further include a recirculating mechanism to return excess slurry from the drip tray to the slurry inlet or other inlet. In certain aspects, for example when the product is particularly valuable or limiting, returning the excess slurry for drying and subsequent unit processing can improve the overall efficiency of the continuous production process. Even further, the drip tray 1501 avoids a need to shut down the continuous process when small amounts of excess slurry are not properly processed. In general however, the real time continuous adjustments of the gap 1410, the slurry intake rate, temperature, drum rotation rate and other parameters limit the need for the drip tray 1501. In certain aspects, the necessity for adjustment of the gap 1410 can be indicated by slurry dripping into the drip tray 1501. This can be monitored on the drip tray 1501 itself using video, changes in conductivity, weight, laser distance or proximity sensor and the gap 1410 automatically adjusted. Alternatively, as discussed below, the potential for dripping can be assessed using video monitoring of the distribution of the slurry layer across the width of the rotatable drum 1101 (see FIG. 15).

Figure 13A:
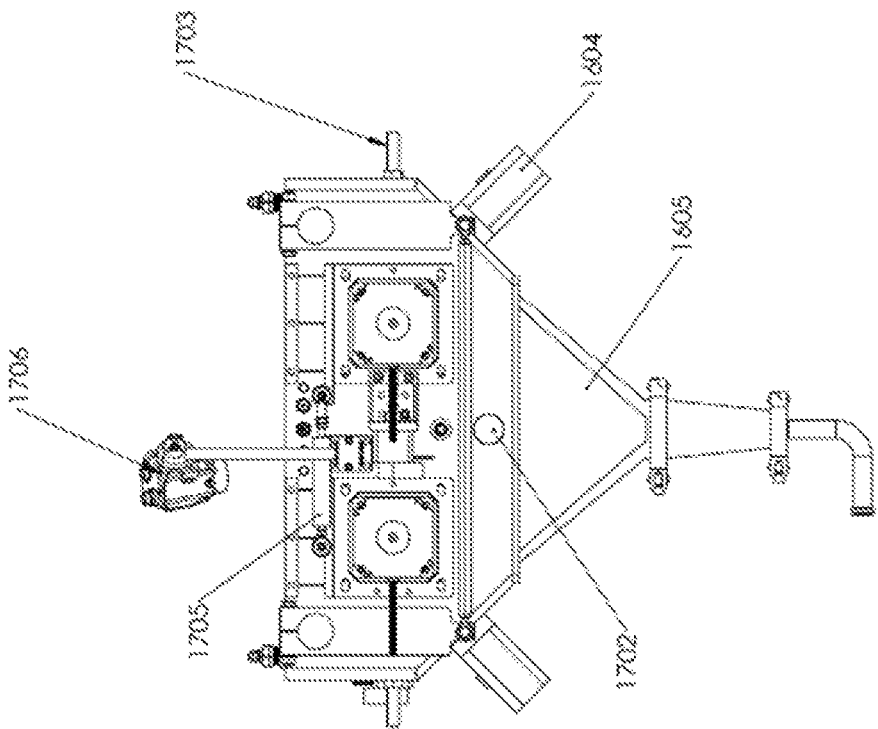
FIG. 13 provides technical drawings presenting front and rear views illustrating a port for a vacuum sensor 1707, front and rear linear position sensors (1704 and 1705, respectively), an infrared temperature sensor 1703, and front and rear endoscope ports which enable viewing of a drum gap, and material flow along the side panel (1701 and 1702, respectively). In addition, this aspect shows a monitoring camera system 1706 for monitoring a slurry above the drum gap. Also shown are side vibrators 1604.
Figure 13B:
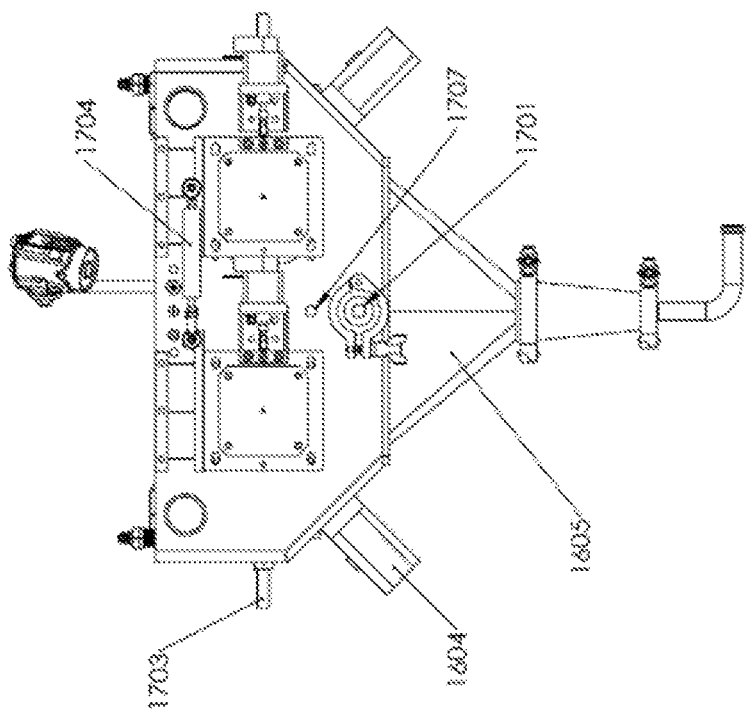
Figure 14:
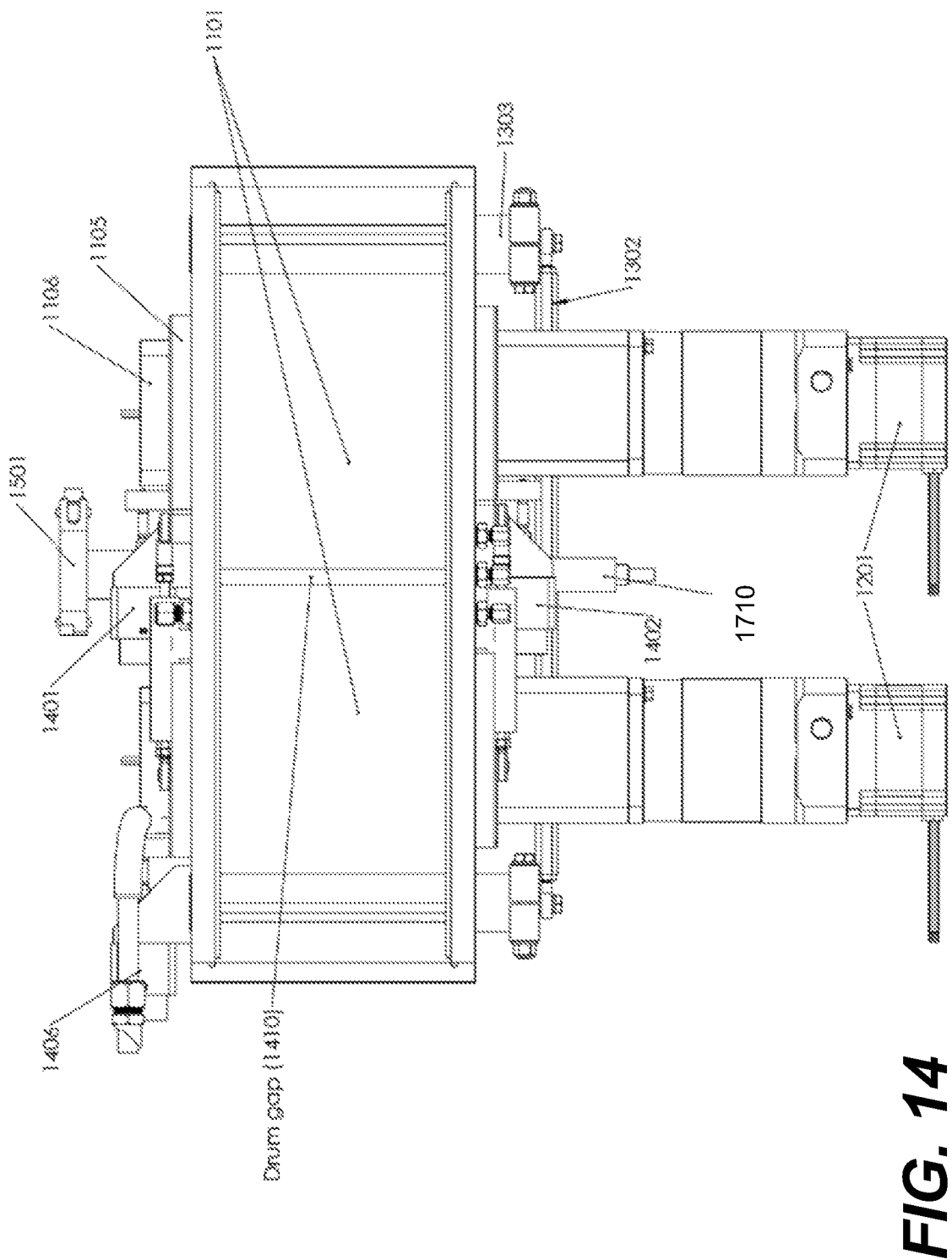
FIG. 14 is a technical drawing presenting a top view according to an aspect of the present disclosure illustrating the rotatable drums 1101 and the drum gap 1410.

The present disclosure discloses, and provides for, a continuous drying apparatus that can accommodate a wide range of slurry types and compositions and adjust the drying parameters in real-time to maintain a steady state output of dried solid. Among the parameters that can be adjusted during the drying process include the gap 1410 distance, the evaporative surface temperature, the rotatable drum rotation rate, the slurry input flow rate, and the housing pressure. As discussed below and as illustrated in FIG. 13, a continuous drying apparatus according to the present disclosure can include one or more sensors, including but not limited to, a drum gap endoscope 1701, a side panel endoscope 1702, an infrared temperature sensor 1703, linear positions sensors 1704 and 1705, a camera monitoring system 1706 and a vacuum sensor 1707. The output of the dried solid can further be monitored for the amount of retained liquid. In an aspect, an in-line nIR spectrometer is located in or after an air-lock (1505) immediately after the cyclonic separator (1502) that can monitor in real-time the residual solvent content of the dried solid material. In another aspect, a residual moisture sensor can be provided as part of the collection vessel (1504). The sensors provide feedback data to a controller to control the physical parameters of the drying device and provide for the drying of slurries of diverse types and composition.

The present disclosure provides for, and includes, drying of slurries comprising a variety of liquid carriers. Accordingly, a continuous drying apparatus must be prepared from materials that are compatible with a wide range of solvents and liquids. In some aspects, the apparatus is resistant to a liquid or solvent including, but not limited to acetic acid, acetone, acetonitrile, benzene, 1-butanol, 2-butanol, 2-butanone, t butyl alcohol, carbon tetrachloride, chlorobenzene, chloroform, cyclohexane, 1,2-dichloroethane, diethylene glycol, diethyl ether, diglyme, 1,2-dimethoxyethane, dimethyl formamide, dimethyl sulfoxide, 1, 4-dioxane, ethanol, ethyl acetate, ethylene glycol, heptane, hexane, methanol, methyl t-butyl ether, methylene chloride, N-methyl-2-pyrrolidinone, nitromethane, pentane, ligroine, 1-propanol, 2-propanol, pyridine, tetrahydrofuran, toluene, triethylamine, water, o-xylene, m-xylene, p-xylene, and combinations thereof.

In an aspect, the housing and internal components are prepared from a metal, a metal alloy or a polymer that is solvent resistant, resists oxidation or reduction, and corrosion. In some aspects, the components can be prepared from suitable resistant materials. In certain aspects, the internal surface of the housing and other internal components can be coated with a suitable protective material to provide a protective coating. As discussed above, where such surfaces are subject to continuous wear (e.g., the rotatable drum and scraper/brush combination), coatings may not be suitable as they may contaminate the resulting dried solid. In other aspects, surfaces that are only incidentally exposed to the solvents and solids can be coated with a protective coating, including but not limited to fluoropolymers including for polytetrafluoroethylene (Teflon®) and Xylan®, polyurethane, Molybdenum Disulfide, air dried epoxy, thermal cured epoxy, phenolic coatings, Phosphate-ferrous metal coatings, inorganic zinc, PPS/Ryton®, FEP-PTFE, PVDF/Dykor®, ECTFE/Halar®, amorphous fluoropolymer (CYTOP), and ceramic epoxy coatings. The selection and application of suitable coating materials to protect the components of a continuous drying apparatus are known to a person of skill in the art.

The present disclosure provides for, and includes, the drying of slurries having between about 1 weight % (wt %) solid and about 80 wt % solid. In aspects according to the present disclosure, the slurry may comprise between about 1 wt % and 50 wt % solid. In aspects according to the present disclosure, the slurry may comprise between about 1 wt % and 25 wt % solid. In another aspect, the slurry comprises between about 15 wt % and 25 wt %. In another aspect according to the present disclosure, the slurry may comprise less than 1 wt % solid. Previous devices for the drying of slurries were unable to accommodate such wide ranges of slurry compositions.

In aspects according to the present disclosure, the inclusion of a vacuum, conductive heating elements in the rotating drums 1101, and provision for a variable gap 1410 allows for a wide range of slurries to be accommodated without reconfiguring the drying apparatus. The continuous drying apparatus also provides for the development of appropriate drying methods by providing slurries that have different weight percent amounts of solids and continuously varying the drying conditions, including the temperature, relative vapor pressure, drum speed, and rotating drum gap 1410. Additional factors that affect the characteristics of suitable slurries for drying in the continuous drying apparatus according to the present disclosure include the size of the suspended solids.

The present disclosure further provides for, and includes, the drying of slurries provided to the continuous drying apparatus in wt % ratios that vary over time. In aspects according to the present disclosure, the steady state wt % ratio of the slurry can vary as much as 30% without resulting in dripping or contamination of the dried solid. Thus, a slurry in a continuous production system can be provided to a continuous drying apparatus at 1 wt % and vary between 0.7 wt % and 1.3 wt %. In other aspects, a slurry can be provided at a rate of about 50 wt % and vary between 65 wt % and 35 wt %. In aspects according to the present disclosure, a slurry may be provided at a wt % of about 1% and varying by 10% (e.g., between 0.9% and 1.1%). In another aspect, the wt % can be provided at about 15% and vary between 12% and 20%. In other aspects, the wt % can vary by 10% of the expected flow rate. In yet other aspects, the wt % can vary by 5% or less of the expected flow rate.

One of ordinary skill in the art would understand that the ability of a continuous drying apparatus to accommodate changes in the flow and composition of the slurry further depends on the size of the evaporative surface area. In aspects according to the present disclosure, an apparatus can be designed and incorporated into a continuous production process in anticipation of expected variations.

The continuous drying apparatus of the present disclosure provides for variable speeds of rotation of the rotatable drums 1101 and can accommodate changes in input flow rates of a slurry. The input flow rates according to the present disclosure can vary between 1 milliliter/minute (ml/min) to 3000 liters/min. The capacity to dry slurries at a given flow rate depends on the length of the drum, the evaporative surface area, the rotational speed, the drum temperature, and the presence and pressure of a vacuum. For a given configuration (e.g., the size and area of the rotatable drum 1101) larger flows can be accommodated by increasing the rotational speed, increasing the temperature (if not detrimental to the product) and increasing the vacuum. In some aspects, a continuous drying apparatus having a drum radius of 11 cm and drum length of 15 cm, an evaporative surface area of 1,296 $cm^2$ and having a rotational speed of 1 to 2 rotations per minute (rpm) could reduce a slurry having 50 wt % solid having an input flow rate of 5 ml/min to a dried solid having a residual moisture content of <100 ppm.

A benefit of the continuous drying apparatus of the present disclosure is the incorporation of process control and process monitoring. Incorporation of sensors and control mechanisms into a unit device provides for a centralized process controller to coordinate and maintain a steady state production process within defined tolerances (e.g., QbD). In aspects according to the present disclosure, an apparatus further comprises a controller. In some aspects the controller can act as a master controller to provide for process control of the drying unit. A master controller can monitor and control the unit process as a standalone device, adjusting for example, the gap 1410, the drum 1101 rotation speed, evaporative surface temperature, and vacuum pressure. The controller can accept sensor input including, but not limited to, output from a drum gap endoscope 1701, a side panel endoscope 1702, an infrared temperature sensor 1703, linear positions sensors 1704 and 1705, a camera monitoring system 1706 and a vacuum sensor 1707. In other aspects, the controller can provide local control wherein a master process controller coordinates the overall process and the function of the individual unit process controllers. In some aspects, a unit controller further includes one or more communications ports.

In aspects according to the present disclosure the unit controller controls a variable selected from the group consisting of the drum gap 1410, the drum 1101 rotation speed, evaporative surface temperature, and vacuum pressure. In an aspect, the unit controller controls the temperature of said rotatable drums 1101. In a further aspect, the unit controller measures the temperature of the rotatable drums 1101 using infrared sensor 1703 and adjusts the temperature of the rotatable drums using drum heaters 1102 and 1103. In an aspect, the unit controller detects the residual moisture of the dried solid using moisture sensor 1708 and adjusts the rotation speed, drum temperature, gap 1410 or a combination thereof. In some aspects, external sensors can provide input to the controller for coordination of the drying process. Suitable sensors include temperature sensors, vacuum sensors, moisture sensors and combinations thereof. The sensors provide for controlling, among other aspects, the residence time by varying the drum speed and flow rate, the drum temperature, and vacuum.

The present disclosure provides for, and includes, continuous drying apparatus that have a reduced footprint compared to conventional drying units. In aspects of the present disclosure, the continuous drying apparatus covers an area of less than about 10,000 $cm^2$. In another aspect, the continuous drying apparatus covers an area of less than about 7,000 $cm^2$. In an aspect, the continuous drying apparatus has a footprint of less than about 4,000 $cm^2$. In a further aspect, the continuous drying apparatus has a footprint of less than about 3,600 $cm^2$. The present disclosure provides for commercial scale up of continuous drying apparatus up to $3.325 \times 10^6$ $cm^2$.

The present disclosure provides for, and includes, a continuous drying apparatus having an adjustable drum gap, and further comprises a mill for reducing the size of the dried solid material. In aspects of the present disclosure, the mill is selected from a ball mill, rod or slitting mill, autogenous mill, a semi-autogenous grinding (SAG) mill, a pebble mill, high pressure grinding rolls (HPGRs), a Buhrstone mill, a vertical shaft impactor (VSI) mill or a tower mill. The present disclosure further provides for a continuous drying apparatus having two or more mills, including mills of different types.

In aspects according to the present disclosure, the dried solid material is milled to a particle size of between 0.5 μm and 300 μm. In certain aspects the milling of the solid is to increase the homogeneity and dosage uniformity in the resulting end-product. In some aspects, milling is included to increase bioavailability, solubility or both. In aspects according to the present disclosure the continuous drying apparatus provides for a mill bypass.

Also provided for and included in the continuous drying apparatus of the present disclosure is a solid collection vessel. In certain aspects, the solid collection vessel acts to collect bulk solid material prior to a second solid separation at the cyclonic separator 1502. In some aspects the solid collection vessel is situated between the housing and the solid outlet.

The present disclosure provides for and includes a continuous drying apparatus that provides for a device or devices to convey the dried solid material from the housing. In some aspects, the conveying device is a pneumatic vibrator. In other aspects, the conveying device is an auger or an impeller. In another aspect, the dried solid is conveyed by an electric vibrator. In another aspect, an ultrasonic vibrator is included to convey the solid material from the housing. As provided above, in some aspects, the solid is conveyed from the housing by an air flow provided by a vacuum or a vacuum source. Separation of the solid from the air flow can be provided by one or more cyclonic separators.

The present disclosure provides for, and includes a continuous drying apparatus as part of an ICM system, or another manufacturing process, such as a semi-continuous or batch system. In some aspects, a continuous drying apparatus is provided to dry an intermediate product in a multi-step synthetic process. In an aspect, the intermediate is provided to a subsequent reaction step in the ICM process. In another aspect, the continuous drying apparatus dries the active pharmaceutical ingredient in the ICM process. In certain aspects, the API is dried and milled in the continuous drying apparatus.

In some aspects, as part of an ICM system, a continuous drying apparatus receives feedback and instructions from the ICM system controller and the continuous drying apparatus includes a local controller. As part of an integrated system a master ICM controller monitors the process as a whole and incorporates feedback from the process control system as discussed in the paragraphs above. Generally a continuous drying apparatus incorporated into an ICM system will include one or more sensors selected from, but not limited to, a drum gap endoscope 1701, a side panel endoscope 1702, an infrared temperature sensor 1703, linear positions sensors 1704 and 1705, a camera monitoring system 1706 and a vacuum sensor 1707, and a residual moisture analyzer 1708. The continuous drying apparatus can employ an internal control unit to adjust the drying process parameters automatically, or to process instructions from the ICM system controller. A continuous drying apparatus of the present disclosure can adjust the gap 1410, the rotatable drum 1101 temperature and the rotation rate. In other aspects, the continuous drying apparatus of the present disclosure can adjust the gap 1410, the rotatable drum 1101 temperature and the rotation rate, and the vacuum pressure.

The present disclosure provides for, and includes a method of continuously drying a solid using a continuous drying apparatus as described above. In an aspect, the method comprises providing a slurry to a slurry inlet of a continuous drying apparatus, heating the rotatable drums of the apparatus to a first temperature and rotating the drums so that the slurry dries as a cake and provides an evaporate, scraping the cake from the two rotatable drums, collecting the cake as a dried solid and passing the dried solid through a first outlet.

In aspects of the present disclosure, the rotation of the first and second rotatable drums can be varied during the drying process, for example to accommodate increases and decreases in slurry flow rate and composition. In other aspects, the rotation rate can be varied to adjust the amount of retained liquid in the dried solid. In aspects, the rotation rate can be varied between 0.017 and 6 rpm. In an aspect, the rotation rate is between 0.5 and 3 rotations per minute. In other aspects, the rotation rate is 1 to 2 rpm. In aspects according to the present disclosure, the rotation rate is increased to minimize the drying time and to reduce thermal degradation of the product. In some aspects, the rotation rate is increased so that the amount of retained liquid is increased. In certain aspects, the rotation rate is adjusted in response to signals from one or more sensors of the continuous drying apparatus.

The present disclosure further provides for preparing a powder from the cake produced by the continuous drying method. In an aspect, the continuous drying apparatus includes one or more blades to break up any agglomerates thereby producing a powder. In other aspects, the apparatus further includes a mill as described above to prepare a powder. In an aspect, the cake is dried to a residual liquid content of up to 10% wt liquid and then milled using a mill integrated into the apparatus. In aspects according to the present disclosure, the cake is reduced to a power having an average particle size of 0.5 μm to 300 μm.

Unexpectedly, the present disclosure provides for preparing a granulated material directly from a suspended slurry by performing a drying/wet granulation. Wet granulation is typically performed in a twin-screw extruder or an agitated vessel (stirred tank). In the previous approaches, the dried material (typically an active pharmaceutical ingredient (API)) is mixed with a small amount of solvent (for example water) and a polymer and mixed to the desired consistency. The present apparatus and methods provide for taking a suspension of API with polymer in solution and performing the wet granulation while drying. This is a significant improvement over previous methods because it eliminates the need for a separate granulation step. Granulation provides for improved flow and compactability of the compression mix during tablet or pill manufacture. Granules are commonly used in the pharmaceutical industry and typically have a particle size in the range of 0.2-4.0 mm, and are primarily produced as an intermediary with a size range of 0.2-0.5 mm.

The apparatus the methods of the present disclosure provide for the continuous drying and granulation of a slurry. In an aspect, a polymer is dissolved in the liquid carrier prior to preparing a slurry for drying. In an aspect, the slurry in a carrier liquid is combined and mixed with a polymer in the carrier liquid prior to application to the drum dryer. Not to be limited by theory, it is thought that the polymer in the polymer containing slurry, when applied to the continuous drying apparatus of the present disclosure, creates bridges the drying particles to produce a uniformly dried, granulated material. In an aspect, a continuous drying apparatus of the present disclosure, when supplied with a polymer containing slurry does not require a mill to reduce the size of the resulting particles. In another aspect, continuous drying apparatus of the present disclosure, when supplied with a polymer containing slurry, does not produce a cake having agglomerates, but rather a uniform granulated material.

As discussed above, a variety of carrier liquids are suitable for using the continuous drying and granulation methods that are compatible with granulation polymers. Suitable granulation polymers are polymers that are soluble in the carrier liquid of the slurry. Suitable carrier liquids include, but are not limited to, include basic, neutral, and acidic solutions.

Granulation polymers suitable for use in the methods and apparatus of the present disclosure are known in the art. Generally, granulation polymers are selected based on their solubility in the carrier liquid. Suitable examples include cellulose based polymers including, but not limited to methylcellulose, ethylcellulose, hydroxycellulose, hydroxymethylcellulose, hydroxypropylcellulose (HPC), carboxymethylcellulose (CMC), micro-crystalline cellulose (MCC), and hydroxypropylmethylcellulose (HPMC). Other suitable examples include xanthan gum, chitosan, polyethylene oxide, wax, Polyvinyl alcohol (PVA), and polyvinylpyrrolidone (PVP). Suitable granulation polymer include acrylic based polymers, for example polymers of dimethylaminoethyl methacrylate, methacrylic acid, methacrylic esters and combinations thereof.

The continuous drying apparatus, when supplied with a polymer containing slurry provides for a uniformly dried, granulated material. In an aspect, the polymer is provided to the slurry at an amount of up to 10% weight polymer to weight solid (wt/wt). In an aspect, the polymer is provided in an amount between 1 to 10% wt/wt. In other aspects, the polymer is provided in an amount between 3 to 5% wt/wt. The incorporation of polymer, dissolved in the carrier liquid provides for granulation and improved flow-ability. This enhances the overall continuous manufacturing process.

The present disclosure provides for and includes a method of drying/wet-granulation comprising using a continuous drying apparatus comprising providing a slurry comprising a solid and a carrier liquid having a dissolved polymer to a slurry inlet 1607 of a continuous drying apparatus comprising a pair of rotatable drums 1101 arranged in parallel to the axes of rotation, separated by a gap 1410, and having drum roller drive assembly 1200, said pair of rotatable drums 1101 comprising an evaporative surface 1110 for receiving a slurry and at least one heating element 1102 a pair of scrapers 1301 for removing a granulated dried material from said evaporative surface 1110 of said rotatable drums 1101 and drying the slurry to produce a granulated dried material. In an aspect, the method includes heating the rotatable drums 1110. In another aspect, the method includes applying a vacuum to an enclosure housing the continuous drying apparatus. In a further aspect the method includes heating the rotatable drums 1110 and applying a vacuum to an enclosure housing the continuous drying apparatus.

In aspects according to the present disclosure, the carrier liquid comprises said dissolved polymer selected from the polymers discussed above at 10% weight polymer/weight solid or less. In an aspect, the carrier liquid comprises said dissolved polymer at between 3% and 5% weight polymer/weight solid.

In aspects according to the present disclosure, the drying/wet granulation method provides for a continuous drying apparatus having a gap 1410 of between 25 micrometers (μm) to 1 millimeter (mm). In another aspect, the gap 1410 is between 25 μm and 150 μm. In yet another aspect, gap 1410 is between 25 micrometers (μm) to 1 millimeter (mm) and maintained at a constant pressure between the rotatable drums 1101 during the drying process. In certain aspects provided for and included in the present disclosure, the gap 1410 may be set to close for a period without interrupting the overall continuous manufacturing process. In an aspect, the gap may be closes to allow for a thorough collection of the dried material.

In aspects according to the present disclosure, the method further comprises assisting the movement of the dried solid using one or more conveyance devices. In some aspects, the method includes vibrating the housing to convey a dried solid towards the first outlet. In an aspect, the housing is vibrated continuously. In other aspects the housing is periodically vibrated to remove any build up of dried solid. In an aspect, the gap 1410 may be closed to facilitate removal of dried solid. In certain aspects, the housing is vibrated in response to a controller signal. In an aspect the vibration is initiated based on a video or other sensor located in the housing. In other aspects, continuous drying apparatus can incorporate one or more 'air blades' or forced air nozzles to periodically clean out retained dried solids, with or without temporary closing of the adjustable gap 1410. As provided above, a number of mechanisms for conveying the dried solid towards the outlet included and provided in the present methods.

The present disclosure provides for a method wherein the evaporate is collected during the drying process. In an aspect, the evaporate is collected through the first outlet of the housing together with the dried solid. In some aspects, the movement of the evaporate provides the force to aid in the flow of the dried solid out of the device. In an aspect, the evaporate moves through the first outlet together with the dried solid and passes through a cyclonic separator. In some aspects, the housing can be provided with an additional flow of gas so that the vacuum is maintained and that a consistent airflow through outlet and through the cyclonic separator is maintained. In aspects of the present disclosure, the evaporate is collected through the first outlet, passes through the cyclonic separator and then is condensed and collected. In some aspects, the condensed evaporate (now liquid) can be returned to the ICM system or removed and packaged for safe disposal.

The present disclosure provides for and includes a method wherein the slurry is provided to the continuous drying device at a rate of between 1 ml/min and 3000 L/min. In an aspect, the slurry is provided at an input rate of at least 1 ml/min but less than 300 ml/min. In another aspect, the slurry is provided at an input rate of at least 1 ml/min but less than 30 ml/min.

While not intended to be limiting, it is expected that in an ICM process, the input slurry rate would be engineered to be maintained within a limited range. In an aspect, the input slurry rate according to a method of the present disclosure can vary ±100% of the desired rate. In other aspect, the input slurry rate varies less than 5%. In yet another aspect, the input slurry rate varies by less than 2.5%. Like the input rate, the method for drying a solid using a continuous drying apparatus provides for an output of the dried solid at a relatively constant rate. In an aspect, the dried solid passes through the first outlet at a rate that varies less than 10%. In another aspect, the dried solid passes through the first outlet at rate that varies less than 5%. As used herein, the rate of dried solid passing through the first outlet is equivalent to rate of collection in a collection bottle 1504 or provided to a downstream unit. As discussed above, the present continuous drying apparatus provides for adjustments in gap width, drying temperature and other parameters to accommodate and adapt in real time to changes in input slurry rates as well as variation in the slurry composition. These adjustments provide for methods having variations in input slurries and output solids as described.

The present disclosure provides for, and includes, a method of continuously drying a solid using a continuous drying apparatus that further comprises applying a vacuum to the housing containing the drying slurry. By placing the system under a lower than ambient pressure, the vapor pressure of the liquid at a given temperature is lowered. Thus, the first temperature applied to the first and second drums of the apparatus may be lower than for a system lacking a vacuum. In aspects according to the present method, the vacuum is maintained below about $1\times10^5$ Pascal (Pa) (e.g., about 1 atm). In an aspect, the vacuum maintained during the drying method is less than $5\times10^4$ Pa. In another aspect, the vacuum maintained during the drying method is less than $1\times10^4$ Pa. In aspects according to the present disclosure, the vacuum during the drying method is maintained between 10 Pa and $1\times10^5$ Pa.

The present disclosure further provides for a method of continuously drying a solid using a continuous drying apparatus that further comprises applying a vacuum to the housing containing the drying slurry and further comprising an airflow through the continuous drying apparatus. In an aspect, the housing of the continuous drying apparatus is maintained at a pressure below $1\times10^5$ Pa and a gas flow is provided. As used herein, a gas is any gas that can be applied to the intermediate, API, or drug product without resulting in reaction or degradation. In aspects of the present disclosure, the gas is dry filtered nitrogen or other suitable inert gas. In other aspects, the gas can be air, carbon dioxide, or a hydrocarbon gas. While not to be limited by theory, the combination of a lowered housing pressure and the flow of gas over the drying solid increases the rate of vaporization of the liquid by lowering the vapor pressure and by quickly removing any evaporate away from the drying surface (convective contribution).

The present disclosure further provides for, and includes, placing the continuous drying apparatus in a fume hood or vented enclosure. In an aspect, the method for drying a solid further comprises operating the continuous drying apparatus within a fume hood or vented enclosure. In an aspect, the method includes operating the continuous drying apparatus within a benchtop laboratory fume hood having an appropriate laminar airflow.

The present disclosure further provides for a method of continuously drying a solid using a continuous drying apparatus wherein the input slurry comprises between about 80 wt % to about 1 wt %. As discussed above, the methods and apparatus of the present disclosure are designed to accommodate slurries of different compositions, but that the overall rate and composition are provided to the apparatus with defined limits. In aspects according to the present disclosure, it is understood that a method for a slurry having a 80 wt % could vary within about 10% of the desired value without reconfiguring the continuous dryer. A particular advantage of the methods and devices of the present disclosure is that the method and devices can be adjusted, for example by changing input rates, changing the gap diameter, changing the temperature, changing the pressure etc., rapidly and in response to sensor signaling. Further, the adaptability of the continuous drying apparatus results in a single apparatus capable of being set to dry a variety of disparate slurries without having to be rebuilt or reconfigured.

In aspects according to the present disclosure, a method of continuously drying a slurry using a continuous drying apparatus comprises providing a slurry having between 80 wt % and 1 wt % solids. In another aspect, the slurry comprises about 25 wt % solid to about 1 wt % solid. In another aspect, the slurry comprises less than 25 wt % solid. In yet another aspect, the slurry comprises less than about 1 wt % solid. As discussed above, aspects of the presently disclosed continuous drying apparatus include mechanisms for adjusting the gap between the rotating drums. Accordingly, even dilute slurries can be dried by reducing the gap as appropriate. For concentrated slurries, the gap can be increases to provide for the increased viscosity of the more concentrated mixtures.

The present disclosure provides for drying solids that are intermediates in a multi-step synthetic process comprising providing the intermediate as a slurry to a slurry inlet of a continuous drying apparatus, heating the rotatable drums of the apparatus to a first temperature and rotating the drums so that the slurry dries as a cake and provides an evaporate, scraping the caked intermediate from the two rotatable drums, collecting the cake intermediate as a dried solid and passing the dried solid through a first outlet. The methods can further comprise the additional steps as discussed above.

The present disclosure provides for drying solids that are the final product in a multi-step synthetic process comprising providing the final product as a slurry to a slurry inlet of a continuous drying apparatus, heating the rotatable drums of the apparatus to a first temperature and rotating the drums so that the slurry dries as a cake of final product and provides an evaporate, scraping the caked final product from the two rotatable drums, collecting the cake final product as a dried solid and passing the dried solid through a first outlet. The methods can further comprise the additional steps as discussed above.

The present disclosure provides for drying solids that are an active pharmaceutical ingredient comprising providing the final product as a slurry to a slurry inlet of a continuous drying apparatus, heating the rotatable drums of the apparatus to a first temperature and rotating the drums so that the slurry dries as a cake of active pharmaceutical ingredient and provides an evaporate, scraping the caked active pharmaceutical ingredient from the two rotatable drums, collecting the caked active pharmaceutical ingredient as a dried solid and passing the dried solid through a first outlet. The methods can further comprise the additional steps as discussed above.

The methods and apparatus of the present disclosure are suitable for removing a wide range of liquids from slurries including aqueous and non-aqueous liquids. The aqueous and non-aqueous liquids suitable for the methods and apparatus include basic, neutral, and acidic solutions. In aspects according to the present disclosure the liquid of the slurry is an organic solvent selected from the group consisting of, but not limited to, acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethylene glycol, diethyl ether, diglyme, 1,2-dimethoxyethane, dimethyl formamide, dimethyl sulfoxide, 1, 4-dioxane, ethanol, ethyl acetate, ethylene glycol, heptane, hexane, methanol, methyl t-butyl ether, methylene chloride, N-methyl-2-pyrrolidinone, nitromethane, pentane, ligroine, 1-propanol, 2-propanol, pyridine, tetrahydrofuran, toluene, triethylamine, water, o-xylene, m-xylene, p-xylene, and combinations thereof.

The present disclosure provides for, and includes modifying the rotatable drum temperature, drum rotations rate, vacuum pressure, and rotatable drum gap to adapt in real time to changes in the input slurry. While the ICM process is designed to maintain each unit step within a narrow range of parameters, each individual unit device requires a built-in ability to adapt that is not required in tradition batch manufacturing and batch manufacturing equipment. The present apparatus and methods provide for sensors, including but not limited to, a drum gap endoscope 1701, a side panel endoscope 1702, an infrared temperature sensor 1703, linear positions sensors 1704 and 1705, a camera monitoring system 1706, a vacuum sensor 1707, and a residual moisture analyzer 1708. In the methods of the present disclosure, data is continuously collected from the sensors and stored by the unit controller and, as appropriate, shared with a ICM controller. Detections in changes in one or more sensors trigger adaptive responses to the continuous drying apparatus. Non-limiting and non-exclusive examples of the types of sensor changes and the associated method adjustments are provided below.

In aspects of the present disclosure, the method provides for maintaining the level of residual liquid in the dried solid. In an aspect, the method provides for increasing the temperature of the rotatable drums for a period of time to reduce the residual liquid. In aspects of the present disclosure, the drum temperature is monitored by an infrared sensors 1703. Upon restoration of the specified residual liquid, the temperature returns to the first drum temperature. In other aspects, the drum temperature may remain at the increased temperature. Alternatively, the drum rotation rate can be decreased or increased to adjust the residual liquid in the dried solid. In another aspect, the method can further include applying a vacuum to the drying method. In such aspects, the ability to control the residual liquid can be adjusted by increases or decreases in the vacuum pressure. The methods further provide for adjusting the residual liquid by decreasing the slurry flow rate. It is further included and provided for that combinations of one or more of the adjustments can be employed to maintain the residual liquid in the dried solid within the specified parameters of the ICM process. One of ordinary skill in the art would understand that certain adjustments are limited by the nature of the solid to be dried. For example, certain solids will be sensitive to high temperatures, thus to reduce the residual liquid, the temperature may need to be maintained, while the rotation speed is decreased and vacuum is increased.

In aspects of the present disclosure, the slurry input rate may need to be adjusted to accommodate changes and variation in the upstream unit operations. Similarly, the dried solid output rate may need to be increased or decreased. As discussed above, the process goals of ICM are to maintain the production stream within specified parameters throughout the process and within each unit operation.

The present methods and apparatus provide for, and include, varying the slurry input rate.

In aspects of the present disclosure, the method further includes varying the slurry input rate. In an aspect, the slurry input rate is between 1.0 ml/min and 3000 L/min. In another aspect, the slurry input rate is between about 1 ml/min and 100 ml/min. In an aspect, the slurry input rate is at least 1.0 ml/min. In another aspect, the slurry input rate is at least 1 ml/min. The present disclosure provides for methods wherein the slurry input rate is between 1 ml/min to 40 ml/min. In some aspects, the slurry input rate is between 1 ml/min and 25 ml/min or between 5 and 25 ml/min.

In aspects of the present disclosure, the method further includes varying the rotatable drum gap 1410. Varying the rotatable drum gap 1410 provides an additional mechanism to provide for steady state conditions in the drum dryer unit as well as the overall ICM process (or semi-continuous or batch process). Increasing the drum gap 1410 allows for accommodation of higher throughput (as long as the slurry is dried to an appropriate level) and can adapt the drying process to increases in slurry viscosity and composition. Similarly, the drum gap 1410 can be decreased to prevent dripping of slurries having low viscosity or low weight percentages of solids (e.g., 1%). Appropriate drum gaps 1410 are provided above.

In aspects of the present disclosure, the method further includes varying the vacuum pressure. Varying the rotatable vacuum pressure provides an additional mechanism to provide for steady state conditions in the drum dryer unit as well as the overall ICM process. For example, increasing the vacuum results in decreased vapor pressure of the liquid and an accelerated evaporation rate. Not to be limited by theory, it is expected that the increased evaporation will result in lower residual liquid in the dried solid. In another aspect, the vacuum rate is increased together with the rotational speed. Not to be limited by theory, the output of dried solid would be increased while retaining the same residual liquid. One of ordinary skill in the art would understand that similar adjustments to the drying process are envisioned and included in the present methods so that the drying process is maintained at a steady state with respect to one or more of the following non-limiting parameters: incoming slurry flow rate, incoming slurry concentration, incoming slurry composition, viscosity, crystal morphology, and output solid residual moisture content.

The present disclosure provides for, and includes, a method of continuously drying a slurry using the apparatus discussed above. As provided above, the continuous drying apparatus provides for varying a number of drying parameters in real-time that provide for maintaining the steady state. As discussed, the drum rotation rate, the drum temperature, the drum gap, and the vacuum pressure can be varied individually or simultaneously. Such changes provide for accommodating changes in the incoming slurry flow rate, its concentration (e.g., wt % solid), and composition (for example solid granularity, particle size, viscosity, and shape). As will be understood by one of ordinary skill in the art, certain parameters are complementary. For example, increasing the drum temperature and decreasing the housing pressure both act to increase the drying rate and reduce the residual liquid in the dried solid. In other aspects, the parameters act antagonistically. For example, increasing the drum temperature and increasing the rotation rate. Other complementary and antagonistic combinations will be apparent to one of skill in the art. Accordingly, the method provides for selecting and choosing from among the various aspects disclosed in the paragraphs above. Importantly, the present methods provide for, and include automated feedback control of the parameters based on sensor input to provide a steady state within the unit and within ICM process as a whole (or within a semi-continuous or batch process).

The present disclosure also provides for, and includes, methods wherein the residence time of the slurry and drying solid are controlled. As used herein, the residence time refers to the amount of time from the entry of the slurry through the input 1607 to exit through outlet 1610. In some aspects, controlling the residence time provides for minimizing degradation and/or agglomeration in spontaneously unstable solids. In other aspects, the residence time is minimized to limit the amount of time a solid is exposed to a higher than desirable temperature. Finally, the residence time may be adjusted according to the methods of the present disclosure to provide for maintaining the steady state of the ICM process as a whole.

In aspects according to the present disclosure, the residence time of the solid in the apparatus is less than one hour. In an aspect, the residence time according to the present methods is less than 30 minutes. In another aspect, the residence time is no longer than 10 minutes. In certain aspects, the residence time is less than 5 minutes. In other aspects, the residence time of a solid in the apparatus is about 15 sec. In an aspect, the residence time is between 15 seconds and 1 hour. In an aspect, the residence time is between 15 seconds and 2 minutes. In an aspect, the residence time is between 15 seconds and 1 minute. In another aspect, the residence time is between 1 minute and 1 hour. In another aspect, the residence time is between 5 minutes and 1 hour. In yet another aspect, the residence time is between 1 minute and 30 minutes. Other aspects of the present disclosure provide for residence times of between 1 and 10 minutes. Other aspects of the present disclosure provide for residence times less than 15 sec.

The present disclosure provides for, and includes, methods to minimize or reduce agglomeration of a dried solid. As provided herein, the present apparatus and methods are improved over batch agitated dryers due to the lower temperatures that can be used. In another aspect, the reduced thickness of the drying slurry, as provided by a reduced gap 1410 also acts to reduce agglomeration. In some aspects, the agglomeration is reduced through the inclusion of one or more blades to break up the agglomerates prior to passage through the outlet 1610. In an aspect, minimizing agglomeration comprises minimizing the temperature of the evaporative surface 1110 and by increasing the vacuum. In an aspect, agglomeration is reduced by decreasing the gap 1410. Agglomeration is further reduced by the lower temperatures, reduced residence time, and reduced pressure so that recrystallization-induced inter-particle annealing is reduced or prevented.

The present disclosure provides for, and includes, methods to minimize or reduce thermal degradation of a dried solid. As provided herein, the present apparatus and methods are improved over batch agitated dryers due to the lower temperatures that can be used. In another aspect, the reduced thickness of the drying slurry, as provided by a reduced gap 1410 also acts to reduce thermal degradation by reducing the heat required to dry the slurry. In an aspect, minimizing degradation comprises minimizing the temperature of the evaporative surface 1110 and by increasing the vacuum. In an aspect, degradation is reduced by decreasing the gap 1410. Degradation is further reduced by the lower temperatures, reduced residence time, and reduced pressure. As will be evident to one of ordinary skill in the art, the present apparatus provides a variety of complementary mechanisms for reducing thermal degradation, the importance of which will vary with the chemical composition of the solid in the slurry to be dried.

As provided above, the present apparatus and methods are designed to provide a continuous drying capability to an input slurry. Importantly, in the context of an ICM process (in addition to a semi-continuous or batch process), stoppages in the overall production are very undesirable and problematic. Accordingly, the present apparatus and methods are designed to operate continuously for extended periods. In addition, the present apparatus and methods are designed to operate continuously for extended periods and accommodate variations in the input slurry. Using a variety of internal controls as detailed above, the methods and apparatus of the present disclosure achieve at steady state output of a dried solid having a defined residual moisture content. Accordingly, in contrast to existing methods and devices, the present disclosure provides an important unit operation to an ICM process, as well as a semi-continuous or batch process.

In aspects according to the present disclosure, the operation of the device is indefinite. That is, absent a catastrophic failure of a component of the apparatus, or a failure to provide a continuous stream of slurry to dry, the method provides for continuous operation. In certain aspects, the process is stopped merely to provide for preventative maintenance or because the desired amount of final product in the ICM process has been prepared. In an aspect, the slurry is provided continuously for between 1 hour and 1 year. In certain aspects, the slurry is provided for between 1 week and one month. In an aspect, the slurry is provided continuously for at least 1 hour. In another aspect, the slurry is provided continuously for at least 1 day. In another aspect, the slurry is provided continuously for at least 1 week. In an aspect, the slurry is provided continuously for at least 1 month. In an aspect, the slurry is provided continuously for at least 1 year.

The present disclosure provides for, and includes, drying a slurry to prepare continuous amount of dried solid over a period of time. As provided, the present methods provide for an output of between about 10 grams per hour (g/hr) and about 700 g/hr of dried solid. In an aspect, the output of dried solid is between 10 and 100 g/hr. As the present methods and apparatus are designed to be run continuously, in some aspects the method outputs between 10 g/hr to about 5,000 tons/year.

As discussed above, the present apparatus and methods provide for varying the rotational rate of the paired rotatable drums 1101 to between 0.017 to 6 rpm. Accordingly, the apparatus of may include one or more motors capable of rotating the drums and further providing appropriate control. Suitable motors include electric motors such as stepper motors. In certain aspects, the drive assembly provides a rotation rate of between 0.5 to about 5 rpm. In other aspects, the drive assembly 1200 provides for a rotation rate of between 1 to about 2 rpm. In some aspects, the rotation rates is maintained below 6 rpm. As will be understood, the rates will depend on the nature of the solid to be dried. Slower rates provide for increased drying while faster rotation rates decrease the drying time and would reduce degradation.

The present disclosure provides for methods and apparatus to continuously dry a slurry to a solid wherein the residual liquid of the dried solid is monitored. The present disclosure further provides for monitoring the dried solid and adjusting the method to increase or decrease the amount of residual solvent. Suitable methods of modifying the method are discussed above. Also provided for, and included, are automated methods to maintain the composition of the dried solid (e.g., residual solvent) using automated controls.

In an aspect, the method includes a continuous drying apparatus that includes an inline solvent monitor that operates downstream from the outlet 1610. In another aspect, the solvent monitor may be placed after a cyclonic separation in cyclonic separator 1502. As provided herein, the method provides for a dried solid having a residual liquid content of less than 10%. Also provided for are dried solids having a residual liquid content of less than about 0.5%. In another aspect, the solid is dried to less than about 0.1% of residual liquid.

The present disclosure further provides for and includes an integrated milling step wherein the apparatus further includes a mill. In an aspect, the mill prepares a powder from the dried solid having average particle size between 0.5 μm to 300 μm. Also included and provided is a powder having a residual liquid content of less than 10%. In an aspect, the powder has a residual liquid content of less than about 0.5%. In another aspect, the powder is dried to less than about 0.1% of residual liquid.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

EXEMPLARY EMBODIMENTS

Embodiment 1

A continuous drying apparatus, comprising: a pair of rotatable drums 1101 arranged in parallel to the axes of rotation, separated by a gap 1410, and having drum roller drive assembly 1200, said pair of rotatable drums 1101 comprising: an evaporative surface 1110 for receiving a slurry; and at least one heating element 1102; a pair of scrapers 1301 for removing a dried solid from said evaporative surface 1110 of said rotatable drums 1101; a housing 1600 capable of operation at a reduced pressure; an outlet 1610; and a slurry inlet 1607.

Embodiment 2

The apparatus of embodiment 1, wherein said gap 1410 is adjustable between about 25 micrometers to 2.5 millimeters (mm) or between zero and 2.5 mm. The apparatus of embodiment 2, wherein said gap 1410 is adjustable in increments of 0.01 mm or greater.

Embodiment 3

The apparatus of embodiments 1 or 2, wherein said housing 1600 further comprises one or more ports selected from the group consisting of a vacuum port, a gas inlet port.

Embodiment 4

The apparatus of any one of embodiments 1 to 3, wherein said rotatable drums 1101 are fabricated from a lightweight material selected from the group consisting of aluminum, steel, stainless steel, carbon steel, austenite nickel-chromium-based alloy, a nickel-base alloy and a polymer.

Embodiment 5

The apparatus of any one of embodiments 1 to 4, wherein said aluminum is hard-anodized aluminum and said steel is stainless steel.

Embodiment 6

The apparatus of any one of embodiments 1 to 5, wherein said pair of rotatable drums 1101 have a diameter of about 8 cm to about 1,000 cm, a length between about 2 cm to about 1,000 cm.

Embodiment 7

The apparatus of any one of embodiments 1 to 6, wherein said pair of rotatable drums 1101 have a combined evaporative surface 1110 of about 250 cm2 to about 4×106 cm2.

Embodiment 8

The apparatus of any one of embodiments 1 to 7, wherein said pair of rotatable drums 1101 have a combined evaporative surface 1110 of about 2,500 cm2.

Embodiment 9

The apparatus of any one of embodiments 1 to 8, wherein said slurry comprises about 80 wt % solid to about 1 wt % solid in a liquid.

Embodiment 10

The apparatus of any one of embodiments 1 to 9, wherein said solid comprises an intermediate, final product, or an active pharmaceutical ingredient of a multi-step synthetic process.

Embodiment 11

The apparatus of any one of embodiments 1 to 10, wherein said liquid is an organic solvent selected from the group consisting of: acetic acid, acetone, acetonitrile, benzene, 1-butanol, 2-butanol, 2-butanone, t butyl alcohol, carbon tetrachloride, chlorobenzene, chloroform, cyclohexane, 1,2-dichloroethane, diethylene glycol, diethyl ether, diglyme, 1,2-dimethoxyethane, dimethyl formamide, dimethyl sulfoxide, 1, -4-dioxane, ethanol, ethyl acetate, ethylene glycol, heptane, hexane, methanol, methyl t-butyl ether, methylene chloride, N-methyl-2-pyrrolidinone, nitromethane, pentane, ligroine, 1-propanol, 2-propanol, pyridine, tetrahydrofuran, toluene, triethylamine, water, o-xylene, m-xylene, p-xylene, and combinations thereof.

Embodiment 12

The apparatus of any one of embodiments 1 to 11, further comprising a vacuum controller.

Embodiment 13

The apparatus of any one of embodiments 1 to 12, wherein said heating element 1102 is selected from the group consisting of a conductive heater, a convective heater, a thermoelectric heater, a Peltier heater, an air heater, recirculating heating fluid, steam, infrared, RF, and combinations thereof.

Embodiment 14

The apparatus of any one of embodiments 1 to 13, wherein said heating element 1102 comprises a center drum heater 1102.

Embodiment 15

The apparatus of any one of embodiments 1 to 14, further comprising an outer drum heating element 1103.

Embodiment 16

The apparatus of any one of embodiments 1 to 15, wherein said heating element 1102 is an induction heater, a convective heater, a microwave heater, an infrared heater or combination thereof.

Embodiment 17

The apparatus of any one of embodiments 1 to 14, wherein said outer drum heating element 1103 is an induction heater, a convective heater, a microwave heater, an infrared heater or combination thereof.

Embodiment 18

The apparatus of any one of embodiments 1 to 17, further comprising a vacuum source 1506 for evacuating the housing 1600.

Embodiment 19

The apparatus of any one of embodiments 1 to 18, wherein said vacuum source 1506 is a vacuum pump.

Embodiment 20

The apparatus of any one of embodiments 1 to 19, wherein said vacuum source 1506 is in fluid communication with said outlet 1610.

Embodiment 21

The apparatus of any one of embodiments 1 to 20, further comprising at least one vibrator 1504 for conveying the dried solid from said housing 1600.

Embodiment 22

The apparatus of any one of embodiments 1 to 21, wherein said scraper 1301 comprises a blade or a brush.

Embodiment 23

The apparatus of any one of embodiments 1 to 22, wherein said housing 1600 further comprises a hopper 1605.

Embodiment 24

The apparatus of any one of embodiments 1 to 23, further comprising at least one vibrator 1604.

Embodiment 25

The apparatus of any one of embodiments 1 to 24, further comprising a solid collection vessel between the housing 1600 and the solid outlet.

Embodiment 26

The apparatus of any one of embodiments 1 to 25, further comprising a mill.

Embodiment 27

The apparatus of any one of embodiments 1 to 26, further comprising a load cell configured to measure the pressure exerted on a solid being dried between the rotatable drums 1101.

Embodiment 28

The apparatus of any one of embodiments 1 to 27, wherein said load cell is selected from the group consisting of a hydraulic load cell, a pneumatic load cell, and a strain-gage load cell.

Embodiment 29

The apparatus of any one of embodiments 1 to 28, wherein the footprint of the apparatus is less than about 3,325,000 cm2.

Embodiment 30

The apparatus of any one of embodiments 1 to 29, wherein the footprint of the apparatus is less than about 7,000 cm2.

Embodiment 31

The apparatus of any one of embodiments 1 to 30, wherein the footprint of the apparatus is less than about 4,000 cm2.

Embodiment 32

The apparatus of any one of embodiments 1 to 31, wherein the footprint of the apparatus is about 3,600 cm2.

Embodiment 33

A method of continuously drying a slurry using a continuous drying apparatus comprising: providing a slurry comprising a solid and a carrier liquid to a slurry inlet 1607 of a continuous drying apparatus comprising: a pair of rotatable drums 1101 arranged in parallel to the axes of rotation, separated by a gap 1410, and having drum roller drive assembly 1200, said pair of rotatable drums 1101 comprising an evaporative surface 1110 for receiving a slurry and at least one heating element 1102; a pair of scrapers 1301 for removing a dried solid from said evaporative surface 1110 of said rotatable drums 1101; a housing 1600 capable of operation at a reduced pressure; an outlet 1610; and a slurry inlet 1607; heating said pair of rotatable drums 1101 to a first temperature; rotating said pair of rotatable drums 1101 at a rotation rate; drying said slurry to produce a cake and an evaporate; scraping said cake from said pair of rotatable drums 1101; collecting said cake as a dried solid; and passing said dried solid through said outlet 1610.

Embodiment 34

The method of embodiments 32 or 33, wherein said slurry further comprises polymer dissolved in said carrier liquid of said slurry at 10% weight polymer/weight solid or less.

Embodiment 35

The method of any one of embodiments 32 to 33, wherein said slurry further comprises polymer dissolved in said carrier liquid of said slurry is between 3% and 5% weight polymer/weight solid.

Embodiment 36

The method of any one of embodiments 32 to 35, further comprising preparing a powder from said cake.

Embodiment 37

The method of any one of embodiments 32 to 36, wherein said powder is prepared by providing a gap 1410 of between 25 micrometers (μm) to 1 millimeter (mm).

Embodiment 38

The method of any one of embodiments 32 to 37, wherein said gap 1410 is between 25 μm and 150 μm.

Embodiment 39

The method of any one of embodiments 32 to 38, wherein said powder is prepared by providing a gap 1410 of between 25 micrometers (μm) to 1 millimeter (mm) and maintaining a constant pressure between the rotatable drums 1101 during the drying process.

Embodiment 40

The method of any one of embodiments 32 to 39, wherein said continuous drying apparatus includes a mill and said powder is prepared by milling.

Embodiment 41

The method of any one of embodiments 32 to 40, wherein said powder is dried to 10% or less residual moisture and is milled.

Embodiment 42

The method of any one of embodiments 32 to 41, wherein said milling produces a powder having an average particle size of 0.5 μm to 300 μm.

Embodiment 43

The method of any one of embodiments 32 to 43, further comprising applying vibration to said housing 1600 to collect said dried solid.

Embodiment 44

The method of any one of embodiments 32 to 43, wherein said apparatus further comprises vibrator 1604 for applying said vibration.

Embodiment 45

The method of any one of embodiments 32 to 44, wherein said evaporate is collected through said outlet 1610.

Embodiment 46

The method of any one of embodiments 32 to 45, wherein said evaporate is condensed after separation from said dried solid.

Embodiment 47

The method of any one of embodiments 32 to 46, wherein said separation of said evaporate and said dried solid comprises passing said evaporate and said dried solid through a cyclonic separator 1502.

Embodiment 48

The method of any one of embodiments 32 to 47, wherein said apparatus further comprises cyclonic separator 1502 and cyclone vibrator 1503.

Embodiment 49

The method of any one of embodiments 32 to 48, wherein said slurry is provided at a rate of less than 3000 L/min.

Embodiment 50

The method of any one of embodiments 32 to 49, wherein said slurry is provided at a constant rate that varies less than ±100%.

Embodiment 51

The method of any one of embodiments 32 to 50, wherein said drying is performed under vacuum.

Embodiment 52

The method of any one of embodiments 32 to 51, wherein said apparatus further comprises vacuum source 1506.

Embodiment 53

The method of any one of embodiments 32 to 52, wherein said method is performed in a fume hood or a vented enclosure.

Embodiment 54

The method of any one of embodiments 32 to 53, wherein said slurry comprises about 80 wt % solid to about 1 wt % solid in said carrier liquid.

Embodiment 55

The method of any one of embodiments 32 to 54, wherein said slurry comprises about 25 wt % solid to about 1 wt % solid in said carrier liquid.

Embodiment 56

The method of any one of embodiments 32 to 55, wherein said slurry comprises less than about 1 wt % solid in said carrier liquid.

Embodiment 57

The method of any one of embodiments 32 to 56, wherein said polymer is selected from the group consisting of methylcellulose, ethylcellulose, hydroxycellulose, hydroxymethylcellulose, hydroxypropylcellulose (HPC), carboxymethylcellulose (CMC), micro-crystalline cellulose (MCC), hydroxypropylmethylcellulose (HPMC), polyvinyl alcohol (PVA), polyvinylpyrrolidone (PVP), an acrylic based polymer, and combinations thereof.

Embodiment 58

The method of any one of embodiments 32 to 57, wherein said slurry comprises about 80 wt % solid to about 1 wt % solid in said carrier liquid and between 1% and 10% weight polymer to weight solid (wt/wt).

Embodiment 59

The method of any one of embodiments 32 to 58, wherein said slurry comprises about 25 wt % solid to about 1 wt % solid in said carrier liquid and between 1% and 10% weight polymer to weight solid (wt/wt).

Embodiment 60

The method of any one of embodiments 32 to 59, wherein said slurry comprises less than about 1 wt % solid in said carrier liquid and between 1% and 10% weight polymer to weight solid (wt/wt).

Embodiment 61

The method of any one of embodiments 32 to 60, wherein said solid comprises an intermediate in a multi-step synthetic process.

Embodiment 62

The method of any one of embodiments 32 to 61, wherein said solid comprises the final product of a multi-step synthetic process.

Embodiment 63

The method of any one of embodiments 32 to 62, wherein said solid comprises an active pharmaceutical ingredient.

Embodiment 64

The method of any one of embodiments 32 to 63, wherein said liquid is an organic solvent selected from the group consisting of: acetic acid, acetone, acetonitrile, benzene, 1-butanol, 2-butanol, 2-butanone, t butyl alcohol, carbon tetrachloride, chlorobenzene, chloroform, cyclohexane, 1,2-dichloroethane, diethylene glycol, diethyl ether, diglyme, 1,2-dimethoxyethane, dimethyl formamide, dimethyl sulfoxide, 1, 4-dioxane, ethanol, ethyl acetate, ethylene glycol, heptane, hexane, methanol, methyl t-butyl ether, methylene chloride, N-methyl-2-pyrrolidinone, nitromethane, pentane, ligroine, 1-propanol, 2-propanol, pyridine, tetrahydrofuran, toluene, triethylamine, water, o¬-xylene, m-xylene, p¬-xylene, and combinations thereof.

Embodiment 65

The method of any one of embodiments 32 to 64, wherein said liquid content of said dried solid is monitored.

Embodiment 66

The method of any one of embodiments 32 to 65, wherein said drum temperature is adjusted; said slurry rate is adjusted; said drum rotation is adjusted; etc.

Embodiment 67

The method of any one of embodiments 32 to 66, wherein the continuous drying is at steady state with respect to one or more of the parameters selected from the group consisting of incoming slurry flow rate, incoming slurry concentration, incoming slurry composition, viscosity, and output solid residual moisture content.

Embodiment 68

The method of any one of embodiments 32 to 67, wherein the residence time of said slurry in said apparatus is less than about 1 hour.

Embodiment 69

The method of any one of embodiments 32 to 68, wherein the residence time of said slurry in said apparatus is less than about 30 minutes.

Embodiment 70

The method of any one of embodiments 32 to 69, wherein the residence time of said slurry in said apparatus is less than about 10 minutes.

Embodiment 71

The method of any one of embodiments 32 to 70, wherein the residence time of said slurry in said apparatus is less than about 5 minutes.

Embodiment 72

The method of any one of embodiments 32 to 71, wherein the residence time of said slurry in said apparatus is less than 1 minute.

Embodiment 73

The method of any one of embodiments 32 to 72, wherein the residence time of said slurry in said apparatus is about 15 seconds.

Embodiment 74

The method of any one of embodiments 32 to 73, wherein agglomeration of said dried solid is minimized.

Embodiment 75

The method of any one of embodiments 32 to 74, wherein degradation of said dried solid is minimized.

Embodiment 76

The method of any one of embodiments 32 to 75, wherein said slurry is provided continuously for at least 1 hour.

Embodiment 77

The method of any one of embodiments 32 to 76, wherein said slurry is provided continuously for at least 1 day.

Embodiment 78

The method of any one of embodiments 32 to 77, wherein said slurry is provided continuously for at least 1 week.

Embodiment 79

The method of any one of embodiments 32 to 78, wherein said slurry is provided continuously for at least 1 month.

Embodiment 80

The method of any one of embodiments 32 to 79, wherein said slurry is provided continuously for at least 1 year.

Embodiment 81

The method of any one of embodiments 32 to 80, wherein said method outputs about 1,700 kg to about 10 g of dried solid per hour.

Embodiment 82

The method of any one of embodiments 32 to 81, wherein said method outputs about 100 g of dried solid per hour.

Embodiment 83

The method of any one of embodiments 32 to 82, wherein said slurry is provided at a volumetric flow rate between about 3,000 L/min and about 1 mL/min.

Embodiment 84

The method of any one of embodiments 32 to 83, wherein s said slurry is provided at a volumetric flow rate of 10 ml/min.

Embodiment 85

The method of any one of embodiments 32 to 84, wherein said rotational rate of said drums 1101 is about 0.017 to about 6 rpm.

Embodiment 86

The method of any one of embodiments 32 to 85, wherein said rotational rate of said drums 1101 is about 1 to about 2 rpm.

Embodiment 87

The method of any one of embodiments 32 to 86, wherein said evaporative surface 1110 of said drums 1101 is heated to a temperature between 25° C. to 150° C.

Embodiment 88

The method of any one of embodiments 32 to 87, wherein said evaporative surface 1110 of said drums 1101 is heated to about 50° C.

Embodiment 89

The method of any one of embodiments 32 to 88, wherein said evaporative surface 1110 of said drums 1101 is heated to about 75° C.

Embodiment 90

The method of any one of embodiments 32 to 89, wherein said evaporative surface 1110 of said drums 1101 is heated to about 150° C.

Embodiment 91

The method of any one of embodiments 32 to 90, wherein the pressure in said housing 1600 is reduced to less than about below about $1 \times 10^5$ Pascal (Pa).

Embodiment 92

The method of any one of embodiments 32 to 91, wherein the pressure in said housing 1600 is reduced to less than about $5 \times 10^4$ Pa.

Embodiment 93

The method of any one of embodiments 32 to 92, wherein the pressure in said housing 1600 is reduced to less than about 1×104 Pa.

Embodiment 94

The method of any one of embodiments 32 to 93, wherein the pressure in said housing 1600 is reduced to less than about 10 Pa.

Embodiment 95

The method of any one of embodiments 32 to 94, wherein said solid is dried to a powder.

Embodiment 96

The method of any one of embodiments 32 to 95, wherein said powder comprises less than about 10% of said solvent.

Embodiment 97

The method of any one of embodiments 32 to 96, wherein said powder comprises less than about 0.5% of said solvent.

Embodiment 98

The method of any one of embodiments 32 to 97, wherein said powder comprises less than about 0.1% of said solvent.

Embodiment 99

A method of drying/wet granulation using a continuous drying apparatus comprising: providing a slurry comprising a solid and a carrier liquid having a dissolved polymer to a slurry inlet 1607 of a continuous drying apparatus comprising: a pair of rotatable drums 1101 arranged in parallel to the axes of rotation, separated by a gap 1410, and having drum roller drive assembly 1200, said pair of rotatable drums 1101 comprising an evaporative surface 1110 for receiving a slurry and at least one heating element 1102; a pair of scrapers 1301 for removing a dried solid from said evaporative surface 1110 of said rotatable drums 1101; a housing 1600 capable of operation at a reduced pressure; an outlet 1610; and a slurry inlet 1607; heating said pair of rotatable drums 1101 to a first temperature; rotating said pair of rotatable drums 1101 at a rotation rate; drying said slurry to produce a granulated dried material; collecting said granulated dried material; and passing said dried solid through said outlet 1610.

Embodiment 100

The method of embodiment 99, wherein said carrier liquid comprises said dissolved polymer at 10% weight polymer/weight solid or less.

Embodiment 101

The method of embodiment 99 or 100, wherein said carrier liquid comprises said dissolved polymer at between 3% and 5% weight polymer/weight solid.

Embodiment 102

The method of any one of embodiments 99 to 101, wherein said powder is prepared by providing a gap 1410 of between 25 micrometers (μm) to 1 millimeter (mm).

Embodiment 103

The method of any one of embodiments 99 to 102, wherein said gap 1410 is between 25 μm and 150 μm.

Embodiment 104

The method of any one of embodiments 99 to 103, wherein said powder is prepared by providing a gap 1410 of between 50 micrometers (μm) to 200 micrometers (μm).

While the present disclosure has been described with reference to particular aspects, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope of the present disclosure.

EXAMPLES

Example 1 (Aliskiren)

The continuous drying apparatus effectively removes the solvent from the initial purified API mixture. The dryer is able to continuously transform a pumped suspension of the API into flowable particulate in ≤1 min.

A suspension of Aliskiren hemifumarate (10.0, 12.5, and 15.0 wt %) in ethyl acetate:ethanol (95:5) was pumped at varying flow rates (6, 8, 10, and 12 ml/min) into the dryer. The rotation rate of the drums were controlled to vary the residence time (0.5, 1.0, 1.5, and 1.75 min) of the suspension. In addition, the drums themselves were heated at a variety temperatures (40, 60, and 75° C.). The vacuum pressure was set at about 47 kPa so that the temperature could be lowered to prevent degradation of the API (T=80° C.). Final API purity and residual solvent content are measured to assess performance. HPLC and headspace GC are utilized as the analytical techniques.

Table 2 shows how the product's residual solvent increases from ~1.8% to ~8.5% as the volumetric flow rate increases. The trend is consistent with more material being deposited on the roller per unit time, resulting in increased residual solvent. Uniform and effective drying is a result of maximizing the even distribution of slurry along the drum gap. The extent of suspension distribution across the length of the drums is monitored continuously using the camera system 1706. Based on the data in Table 2, the required specification of dryness at a given scale or volumetric flow rate ($V_F$) can be obtained. That is, residual solvent content at a given $V_F$ is controlled by changing the temperature, vacuum pressure, and residence time. The reduced temperature, short residence time, and reduced pressure resulted in maintaining a high level of purity of the API (for all tests the initial API purity was 99.6% and 99.6% after drying.

Figure 16:
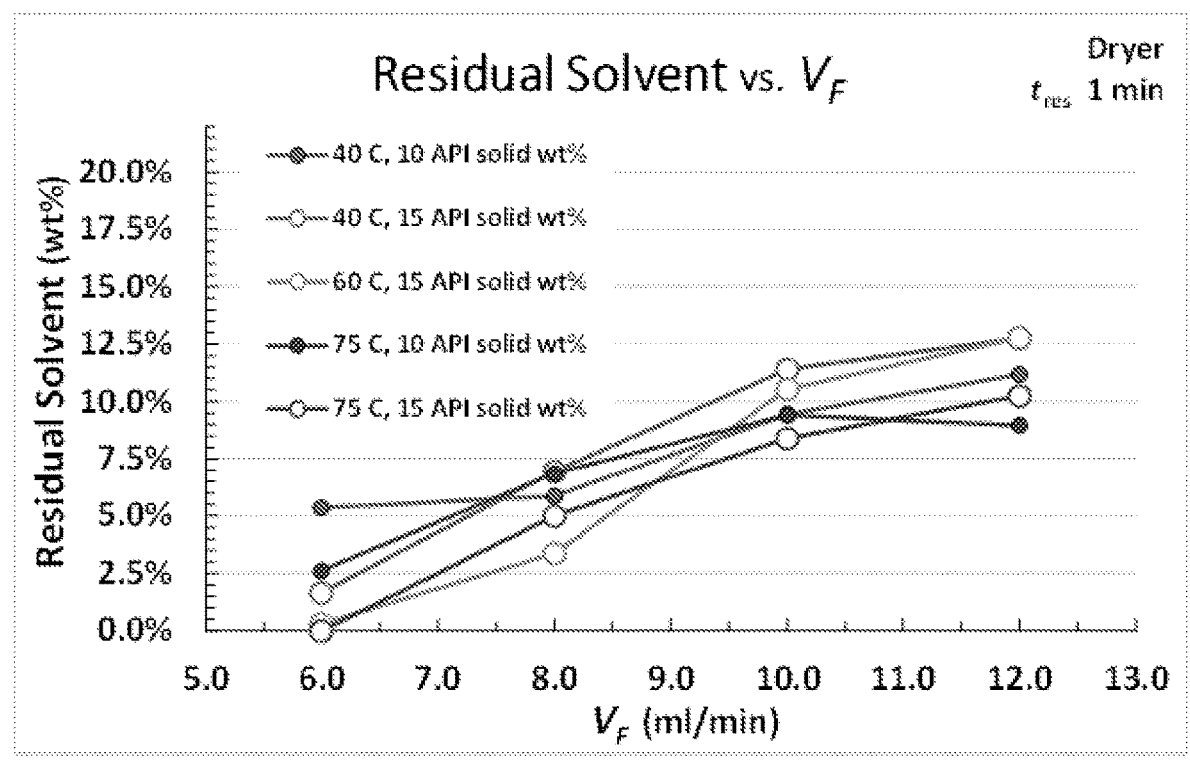
FIG. 16 is a graph of the amount of residual solvent in a dried solid applied to a drum dryer at various input slurry flow rates according to the present disclosure.

FIG. 16 is a graph of the amount of residual solvent in a dried solid applied to a drum dryer at various input slurry flow rates according to the present disclosure.

Table 2. Example 1 Sample of Conditions for Drying Aliskiren

TABLE 2

Example 1 sample of conditions for drying Aliskiren

| Slurry wt % | Flow Rate (ml/min) | Evaporative Surface Area (cm$^2$) | Pressure (kPa) | Residence Time (min) | Drum Temperature (° C.) | Residual EtOAc (wt %) |
|---|---|---|---|---|---|---|
| 15 | 6 | 1296 | 47 | 1 | 40 | 1.8% |
| 12.5 | 8 | 1296 | 47 | 1 | 60 | 2.8% |
| 15 | 12 | 1296 | 47 | 1 | 60 | 8.5% |

Example 2: (API A)

A suspension of API A (25.0 and 40.0 wt %, with 4.2 to 7.3 wt % residual DMSO content on a dry weight basis) in anhydrous ethanol was pumped at varying flow rates (4, 6, 8, 10, and 12 ml/min) into the dryer. The rotation rate of the drums were controlled to vary the residence time (0.5, 1.0, 1.5, and 1.75 min) of the suspension. In addition, the drums themselves were heated at a variety temperatures (45, 55, and 65° C.). The vacuum pressure was set at approximately 47 kPa. Final API purity and residual solvent content are measured to assess performance. HPLC and headspace GC are utilized as the analytical techniques.

Table 3 shows how the product's residual DMSO content increases as the volumetric flow rate increases. The reduced temperature, short residence time, and reduced pressure resulted in maintaining a high level of purity of the API (for all tests the initial API purity was 99.9% and 99.9% after drying).

Table 3. Example 2 Sample of Conditions for Drying API A

TABLE 3

Example 2 sample of conditions for drying API A

| Slurry wt % | Flow Rate (ml/min) | Evaporative Surface Area (cm$^2$) | Pressure (kPa) | Residence Time (min) | Temperature (° C.) | Residual DMSO (wt %) |
|---|---|---|---|---|---|---|
| 25 | 10 | 1296 | 47 | 1 | 55 | 0.39% |
| 25 | 5 | 1296 | 47 | 1 | 65 | 0.38% |
| 25 | 12.5 | 1296 | 47 | 1 | 55 | 0.74% |

Figure 15:
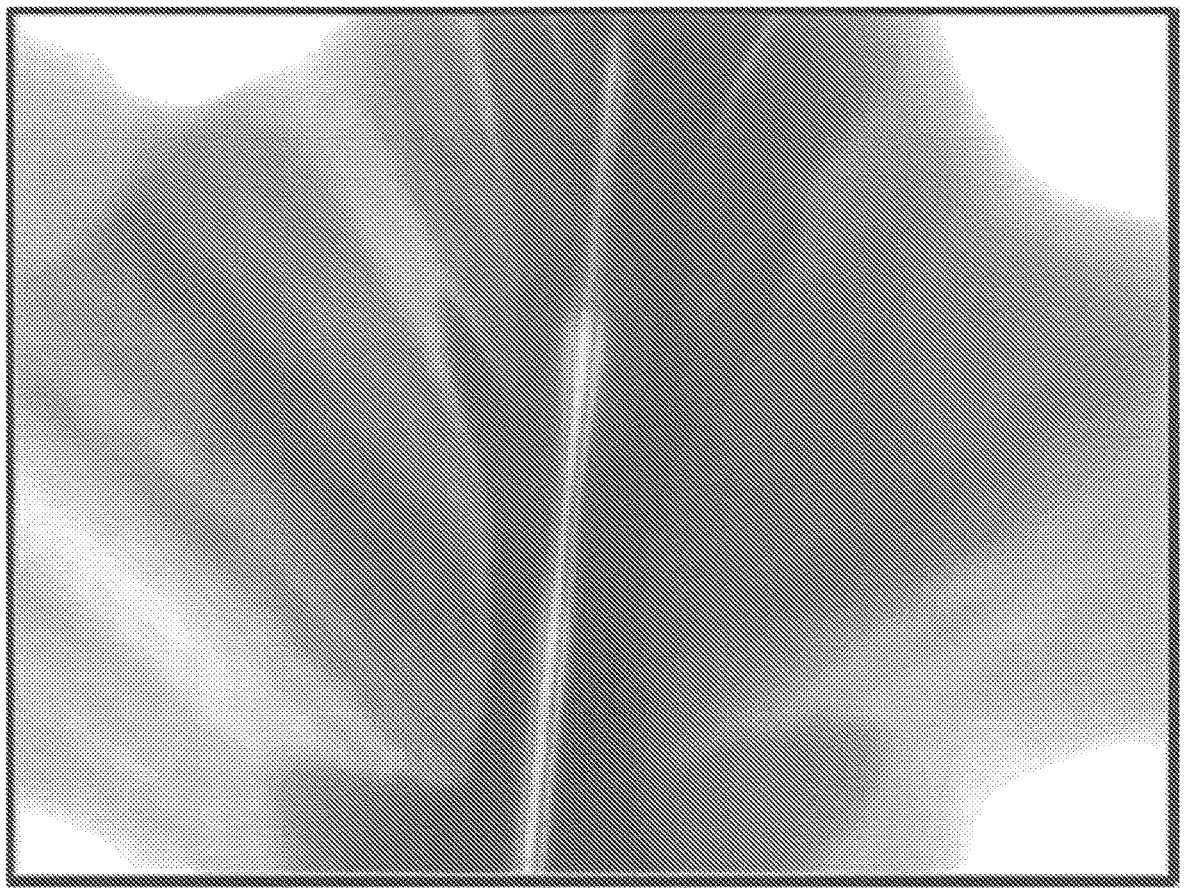
FIG. 15 presents an image from a camera inside a drum dryer according to an aspect of the present disclosure showing uniform distribution of the material across the rotatable drums 1101. The camera is positioned underneath the rollers looking up, and the vertical white line is the gap between the rollers. The white band is the drying solid between the two drums.

As provided herein, the drum gap distance can be adjusted during the process depending on the upstream (initial) concentration and viscosity of the slurry. Effectiveness of the gap control mechanism was assessed by its ability to prevent slurry dripping across the rollers and to uniformly distribute the slurry (thin layer) across the surface of the rollers, as shown in FIG. 15.

Example 3 (API B)

A suspension of API B (30.0, 40.0, and 50.0 wt %) in anhydrous ethanol was pumped at varying flow rates (10, 12.5, 15, and 20 ml/min) into the dryer. The rotation rate of the drums were controlled to vary the residence time (0.5, 1.0, 1.5, and 1.75 min) of the suspension. In addition, the drums themselves were heated at a variety temperatures (40, 50, and 60° C.). The vacuum pressure was set at about 47 kPa. Final API purity and residual solvent content are measured to assess performance. HPLC and headspace GC are utilized as the analytical techniques.

Table 4 shows the product's residual EtOH content remained below 0.1 wt % as the volumetric flow rate was increased. The reduced temperature, short residence time, and reduced pressure resulted in maintaining a high level of purity of the API (for all tests the initial API purity was 99.7% and 99.7% after drying).

Table 4. Example 3 Sample of Conditions for Drying API B

TABLE 4

Example 3 sample of conditions for drying API B

| Slurry wt % | Flow Rate (ml/min) | Evaporative Surface Area (cm$^2$) | Pressure (kPa) | Residence Time (min) | Temperature (° C.) | Residual EtOH (wt %) |
|---|---|---|---|---|---|---|
| 30 | 10 | 1296 | 47 | 1 | 40 | <0.1% |
| 40 | 15 | 1296 | 47 | 1 | 50 | <0.1% |
| 50 | 20 | 1296 | 47 | 1 | 40 | <0.1% |

The invention claimed is:

1. A continuous drying apparatus, comprising:
    a pair of rotatable drums 1101 arranged in parallel to their axes of rotation, separated by a gap 1410, and having drum roller drive assembly 1200, said pair of rotatable drums 1101 comprising:
        an evaporative surface 1110 for receiving a slurry; and
        at least one heating element 1102;
    a drum gap adjustment assembly 1400 comprising a load cell sensor and a controller configured to continuously adjust said gap 1410 during operation to maintain a constant pressure between the surfaces of said pair of rotatable drums 1101, thereby controlling particle size;
    a pair of scrapers 1301 for removing a dried solid from said evaporative surface 1110 of said rotatable drums 1101;
    a housing 1600 capable of operation at a reduced pressure;
    an outlet 1610; and
    a slurry inlet 1607.

2. The apparatus of claim 1, wherein said gap 1410 is adjustable between about 25 micrometers to 2.5 millimeters (mm).

3. The apparatus of claim 2, wherein said gap 1410 is adjustable in increments, wherein each increment is at least 0.01 mm.

4. The apparatus of claim 1, wherein said slurry comprises 80 wt % solid to 1 wt % solid in a liquid.

5. The apparatus of claim 1, wherein said heating element 1102 is selected from the group consisting of a conductive heater, a convective heater, a thermoelectric heater, a Peltier heater, an air heater, recirculating heating fluid, steam, infrared, RF, and combinations thereof.

6. The apparatus of claim 1, further comprising at least one vibrator 1504 for conveying said dried solid from said housing 1600.

7. The apparatus of claim 1, further comprising a mill.

8. A method of continuously drying a slurry using a continuous drying apparatus comprising:
    providing a slurry comprising a solid and a carrier liquid to a slurry inlet 1607 of a continuous drying apparatus comprising:

a pair of rotatable drums 1101 arranged in parallel to their axes of rotation, separated by a gap 1410, and having drum roller drive assembly 1200, said pair of rotatable drums 1101 comprising an evaporative surface 1110 for receiving a slurry and at least one heating element 1102;

a pair of scrapers 1301 for removing a dried solid from said evaporative surface 1110 of said rotatable drums 1101;

a housing 1600 capable of operation at a reduced pressure;

an outlet 1610; and a slurry inlet 1607;

heating said pair of rotatable drums 1101 to a first temperature;

rotating said pair of rotatable drums 1101 at a rotation rate;

drying said slurry to produce a cake and an evaporate;

scraping said cake from said pair of rotatable drums 1101;

collecting said cake as a dried solid; and passing said dried solid through said outlet 1610.

9. The method of claim 8, wherein said slurry further comprises polymer dissolved in said carrier liquid of said slurry at 10% weight polymer/weight solid or less.

10. The method of claim 8, further comprising preparing a powder from said cake, wherein said powder is prepared by providing a gap 1410 of between 25 micrometers (μm) to 1 millimeter (mm).

11. The method of claim 9, wherein said continuous drying apparatus includes a mill and said dried solid is prepared by milling.

12. The method of claim 8, further comprising applying vibration to said housing 1600 to collect said dried solid.

13. The method of claim 8, wherein said evaporate is separated from said dried solid by passing said evaporate and said dried solid through a cyclonic separator 1502.

14. The method of claim 8, wherein said slurry comprises about 80 wt % solid to about 1 wt % solid in said carrier liquid.

15. The method of claim 8, wherein the residence time of said slurry in said apparatus is less than about 1 hour.

16. The method of claim 8, wherein said slurry is provided at a volumetric flow rate between about 3,000 L/min and about 1 mL/min.

17. The method of claim 8, wherein said evaporative surface 1110 of said drums 1101 is heated to a temperature between 25° C. to 150° C.

18. A method of drying/wet granulation using a continuous drying apparatus comprising:

providing a slurry comprising a solid and a carrier liquid having a dissolved polymer to a slurry inlet 1607 of a continuous drying apparatus comprising:

a pair of rotatable drums 1101 arranged in parallel to their axes of rotation, separated by a gap 1410, and having drum roller drive assembly 1200, said pair of rotatable drums 1101 comprising an evaporative surface 1110 for receiving a slurry and at least one heating element 1102;

a pair of scrapers 1301 for removing a dried solid from said evaporative surface 1110 of said rotatable drums 1101;

a housing 1600 capable of operation at a reduced pressure;

an outlet 1610; and a slurry inlet 1607;

heating said pair of rotatable drums 1101 to a first temperature;

rotating said pair of rotatable drums 1101 at a rotation rate;

drying said slurry to produce a granulated dried material;

collecting said granulated dried material; and passing said granulated dried material through said outlet 1610.

19. The method of claim 18, wherein said carrier liquid comprises said dissolved polymer at 10% weight polymer/weight solid or less.

20. The method of claim 18, wherein said granulated dried material is prepared by providing a gap 1410 of between 25 micrometers (μm) to 1 millimeter (mm).

21. The apparatus of claim 1, wherein said housing 1600 capable of operation at a reduced pressure maintains a vacuum below $1 \times 10^5$ Pascal (Pa).

* * * * *